US009150049B2

(12) United States Patent
Albergante et al.

(10) Patent No.: US 9,150,049 B2
(45) Date of Patent: Oct. 6, 2015

(54) AXLE ASSEMBLY

(71) Applicant: Meritor Technology, LLC, Troy, MI (US)

(72) Inventors: Fabrizio Albergante, Cameri (IT);
Davide Colombo, Cameri (IT);
Dhanapal Vittala Raya, Cameri (IT);
Marco Bassi, Cameri (IT)

(73) Assignee: Meritor Technology, LLC, Troy, MI (US)

( * ) Notice: Subject to any disclaimer, the term of this patent is extended or adjusted under 35 U.S.C. 154(b) by 5 days.

(21) Appl. No.: 13/914,828

(22) Filed: Jun. 11, 2013

(65) Prior Publication Data
US 2013/0334786 A1    Dec. 19, 2013

(30) Foreign Application Priority Data
Jun. 14, 2012    (EP) .................................... 12172078

(51) Int. Cl.
*B60B 35/16*     (2006.01)
*B60B 35/12*     (2006.01)
*B60K 17/36*     (2006.01)
*B60G 9/00*      (2006.01)
*F16D 51/00*     (2006.01)
*F16D 55/00*     (2006.01)

(52) U.S. Cl.
CPC ............. *B60B 35/125* (2013.01); *B60B 35/163* (2013.01); *B60G 9/00* (2013.01); *B60K 17/36* (2013.01); *F16D 51/00* (2013.01); *F16D 55/00* (2013.01); *B60B 2900/351* (2013.01)

(58) Field of Classification Search
CPC ....... F16H 57/037; F16H 48/00; F16H 48/30; F16H 48/38; F16H 51/00; F16H 55/00; F16H 2048/00; F16H 2700/00; F16H 57/023; F16H 57/031; B60K 17/16; B60K 17/04; B60K 17/36; B60K 35/16; B60K 35/163; B60B 35/125; B60B 35/163; B60B 2900/351; B60G 9/00
USPC ................................................... 475/220–253
See application file for complete search history.

(56) References Cited

U.S. PATENT DOCUMENTS

| | | | | |
|---|---|---|---|---|
| 4,036,330 | A  * | 7/1977  | Henning et al. | 188/72.8 |
| 4,625,581 | A  * | 12/1986 | Hull | 74/606 R |
| 6,745,471 | B2 * | 6/2004  | Bendtsen | 29/898.07 |
| 6,951,522 | B2 * | 10/2005 | Baxter et al. | 475/205 |

(Continued)

FOREIGN PATENT DOCUMENTS

| | | |
|---|---|---|
| EP | 1591694 A2 | 11/2005 |
| GB | 2080747 A  | 2/1982  |

OTHER PUBLICATIONS

European Patent Office, European Search Report for the corresponding European Patent Application No. 12 17 2078 dated Oct. 25, 2012.

*Primary Examiner* — Ruth Ilan
*Assistant Examiner* — Timothy Wilhelm
(74) *Attorney, Agent, or Firm* — Brooks Kushman P.C.

(57) ABSTRACT

An axle assembly having two hubs, each for connection to a wheel, a housing for differential gears and a mounting arrangement for a braking system for braking a connected wheel. The housing has a depression formed therein. The depression is configured so as to accommodate:
(a) when the mounting arrangement has a drum brake mounted thereon, movement of a slack adjuster of the drum brake in a direction away from one of the hubs nearest the drum brake so as to allow detachment of the slack adjuster; and/or
(b) when the mounting arrangement has a disc brake mounted thereon, an air chamber of the braking system, wherein the air chamber is capable of being partially accommodated within the depression.

12 Claims, 17 Drawing Sheets

(56) References Cited

U.S. PATENT DOCUMENTS

| | | | |
|---|---|---|---|
| 8,528,923 B2 * | 9/2013 | Wakefield et al. | 280/124.116 |
| 2005/0252741 A1 * | 11/2005 | Morris | 188/355 |
| 2006/0021463 A1 | 2/2006 | Peterson et al. | |
| 2008/0265661 A1 | 10/2008 | Harper | |

* cited by examiner

AXLE ASSEMBLY

TECHNICAL FIELD

The present invention relates to an axle assembly. In particular, an axle assembly for a heavy vehicle.

BACKGROUND

A drive axle of a heavy vehicle generally includes a pair of axle shafts housed within a live or rigid axle housing for driving wheels secured to wheel hubs. When a vehicle is driven along a straight path, the wheel hubs will be turning at approximately the same speed, and the drive torque will be equally split between both wheels. When the vehicle negotiates a turn, the outer wheel has to travel over a greater distance than the inner wheel. A differential assembly allows the inner wheel to turn more slowly than the outer wheel as the vehicle negotiates a turn.

Many different kinds of differential gear have been proposed, but the most common consist of a casing in which two or four freely rotatable planetary gears are arranged in mesh with pinion gears of the vehicle drive shafts. The casing carries an annular crown wheel which is driven by a pinion of an input shaft which is itself driven from the vehicle engine.

An example differential assembly is described in EP 1591694.

Two main types of braking systems are used on heavy vehicles; drum brakes and disc brakes.

A drum brake generally has a pair of brake shoes pivotably mounted within the drum and moveable between an applied position and a released position. The applied position causing a wheel connected to the drum brake to brake, and the released position permitting free rotation of a wheel connected to the drum brake. The brake is actuated via an actuation shaft and an actuation device, to cause the brake shoes to move to the applied position. As the brake shoes wear, a slack adjuster adjusts the actuation device to account for the wear of the brake shoes. The slack adjusters typically need maintenance through the life of a brake. Current axle assemblies require removal of multiple components of the drum brake and movement of the actuation shaft, to remove the slack adjuster for maintenance. This is an inconvenient and time consuming process.

A disc brake generally has a brake disc located between two opposed friction elements. To brake a connected wheel, the friction elements are moveable to an applied position, i.e. into contact with the brake disc. On heavy vehicles, the brake disc is generally actuated to an applied position using a pneumatic system. Due to the number of components, including for example vehicle suspension, that need to be assembled to the chassis of a heavy vehicle, it is preferable to arrange components of an axle assembly in a compact manner.

There is therefore a need for an axle assembly that permits easy assembly/disassembly of the slack adjusters of a drum brake and/or has a compact arrangement.

SUMMARY

In a first aspect the present invention provides an axle assembly having:
two hubs, each for connection to a wheel;
a housing for differential gears;
a mounting arrangement for a braking system for braking a connected wheel; and
characterised in that the housing has a depression formed therein, the depression being configured so as to accommodate:
(a) when the mounting arrangement has a drum brake mounted thereon, movement of a slack adjuster of the drum brake in a direction away from one of the hubs nearest said drum brake so as to allow detachment of the slack adjuster; and/or
(b) when the mounting arrangement has a disc brake mounted thereon, an air chamber of the braking system, wherein the air chamber is capable of being partially accommodated within the depression.

Advantageously, accommodation of feature (a) eases the assembly and disassembly of the slack adjuster. In axle assemblies of the prior art to assemble/disassemble the slack adjuster it is necessary for a user to remove the wheel, and components of the braking system including drum and brake shoes and then move an adjuster shaft of the braking system away from the housing so as to create enough room to remove the slack adjuster. Providing a housing with accommodation for feature (a) permits the slack adjuster to be removed/replaced without the need to remove the wheel, the drum or the brake shoes, and there is no need to move the adjuster shaft.

The accommodation of feature (b) enables the assembly to be more compact compared to axles of the prior art, because the depression enables an air chamber of a braking system to be angled towards the housing.

Advantageously the housing of the present invention can be used with either a disc brake or a drum brake.

The axle assembly may comprise two half axle shafts, each connected to one wheel hub.

The axle assembly may comprise an actuation shaft mount for an actuation shaft of a drum brake system, and the depression being positioned adjacent said actuation shaft mount.

The actuation shaft may be mounted to the actuation shaft mount via a bracket.

The housing may comprise an air cylinder mount for mounting an air cylinder of a drum brake system, and the depression may be positioned adjacent said air cylinder mount.

The air cylinder may be mounted to the air cylinder mount via a bracket.

The axle assembly may comprise two depressions; one depression being positioned either side of the air cylinder mount.

In the present application reference to direction refers to the direction when the axle assembly is in conventional attachment to a heavy vehicle, and is for reference purposes only, and not intended to limit the invention to such orientation of attachment to a vehicle.

Reference in the present application to fore and aft direction, and the axis thereof refers to the fore and aft of a vehicle the axle assembly may be attached to, and the axis extends between these opposing directions. Reference to upward and downward direction and the axis thereof refers to the direction towards the main body of the vehicle and away from the main body of the vehicle, respectively, and the axis extending between these opposing directions. Reference to right and left refers to the right and left of the vehicle when travelling in a forwards direction, and the axis thereof extends between the two. The right and left axis is parallel to a longitudinal axis defined by the axle assembly.

The housing may have an aft face opposing a fore face, and an upward face opposing a downward face. Each depression may be positioned on the aft face of the housing. An air cylinder mount may be positioned on the aft face.

For example, the depressions may be positioned either side of the air cylinder mount. In some embodiments the depressions may be positioned towards a downward side of the aft face. Each depression may have a concave transition from a base of the depression to an aft-most region of the aft face in an upward-downward direction, and/or in right-left direction along a longitudinal axis of the axle assembly.

The housing may comprise a coupling on the fore face for a connector shaft to transfer drive from a prime mover to the axle assembly via a further axle assembly.

The housing may have an aft face opposing a fore face, and an upward face opposing a downward face, and each depression may be positioned on the aft face of the housing. An air cylinder mount may be positioned on the upward face.

This positioning of the air cylinder is a safe position away from any obstructions e.g. on the road.

The housing may comprise a coupling for an input drive shaft from a prime mover on a fore face and a coupling for a connector shaft to provide the drive for a further axle assembly on an aft face.

For example, one depression may be positioned on the left most side of the aft face, and one depression may be positioned on the right most side of the aft face. In some embodiments the depression on the left most side of the aft face may extend the full extent of the housing in the upward-downward direction. The right most depression may extend across only a portion of the fore face in the upward-downward direction. The right most depression may extend to the position of the coupling for the connector shaft. Each depression may have a concave transition from a base of the depression to an aft-most region of the aft face in a right-left direction along a longitudinal axis of the axle assembly. The left most depression may have a concave transition from a base of the depression to an aft-most region of the aft face in an upward-downward direction along a longitudinal axis of the axle assembly.

The axle assembly may comprise:
two drum brakes each for braking one of the wheels, each drum brake having a brake shoe moveable between an applied position and a released position with an associated brake drum, an actuation shaft rotatable about a shaft axis and an actuation device for transferring rotational movement of the actuation shaft into movement of the brake shoe from the released position to the applied position;
a slack adjuster connected to the actuation shaft for moving the actuation device so as to account for wear thereof; and
differential gears within the housing for permitting the wheels to turn at different speeds when the vehicle is negotiating a corner.

A tandem axle assembly may comprise an axle assembly of an embodiment of the first aspect connected via a connector shaft to another axle assembly of an embodiment of the first aspect.

The depression formed in the housing may be configured so as to permit the slack adjuster to slide off the end of the actuation shaft without movement of the actuation shaft in the direction of a longitudinal axis of the axle assembly.

The axle assembly may comprise:
at least two disc brakes each for braking one of the wheels;
a pneumatic actuation system for actuating each disc brake, the actuation system including two air chambers; and
differential gears within the housing for permitting the wheels to turn at different speeds when the vehicle is negotiating a corner.

Each air cylinder may be mounted to a component of the disc brakes and angled towards the housing.

The component of the braking system may be a brake caliper of the disc brake.

The air chamber may be positioned between the housing and an airbag of a suspension arrangement of the vehicle.

The suspension arrangement may comprise a suspension arm to which the airbag can attach, and the air chamber may be positioned above the arm when the axle is mounted to a vehicle.

The two air chambers may both be positioned on the same side of the axle assembly.

The suspension arm of the suspension arrangement may be positioned transverse to the longitudinal axis of the axle assembly. In some embodiments the arm is positioned substantially perpendicular to the longitudinal axis of the axle assemble, i.e. in the fore aft direction. The suspension arrangement may comprise four suspension arms and four airbags, each airbag being attached to one arm. Two airbags may be positioned on one side of the axle assembly and the other two airbags may be positioned on another side of the axle assembly. The airbags may be positioned so as to oppose each other. That is, two airbags may be positioned on the fore side, and two on the aft side of the axle assembly, and on each fore or aft side one airbag is positioned towards a right position of the axle assembly and the other airbag is positioned towards a left position of the axle assembly.

The bearing cap may contain at least one bearing and attaches the differential to the housing, and the bearing cap may comprises a depression positioned to accommodate a portion of a depression formed in the housing.

In a second aspect the present invention provides a vehicle having an axle assembly according to the first aspect.

In a third aspect the present invention provides an axle assembly comprising:
an axle for connection to at least two wheels;
two drum brakes each for braking one of the wheels, each drum brake having a brake shoe moveable between an applied position and a released position with an associated brake drum, an actuation shaft rotatable about a shaft axis and an actuation device for transferring rotational movement of the actuation shaft into movement of the brake shoe from the released position to the applied position;
two slack adjusters one connected to each actuation shaft for moving the actuation device so as to account for wear thereof; and
a housing containing differential gears for permitting the wheels to turn at different speeds when the vehicle is negotiating a corner; and
wherein a depression is formed in the housing and is configured so as to accommodate movement of the slack adjuster in a direction away from the respective actuation shaft so as to allow detachment of the slack adjuster.

In a fourth aspect the present invention provides an axle assembly comprising:
an axle for connection to at least two wheels;
two disc brakes each for braking one of the two wheels;
a pneumatic actuation system for actuating each disc brake, the actuation system including an air chamber; and
a housing containing differential gears for permitting the wheels to turn at different speeds when the vehicle is negotiating a corner; and
wherein the housing has a depression formed therein, the depression being configured so as to accommodate the air chamber, the air chamber being angled towards the housing.

BRIEF DESCRIPTION OF THE DRAWINGS

Embodiments of the invention will now be described with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 31:
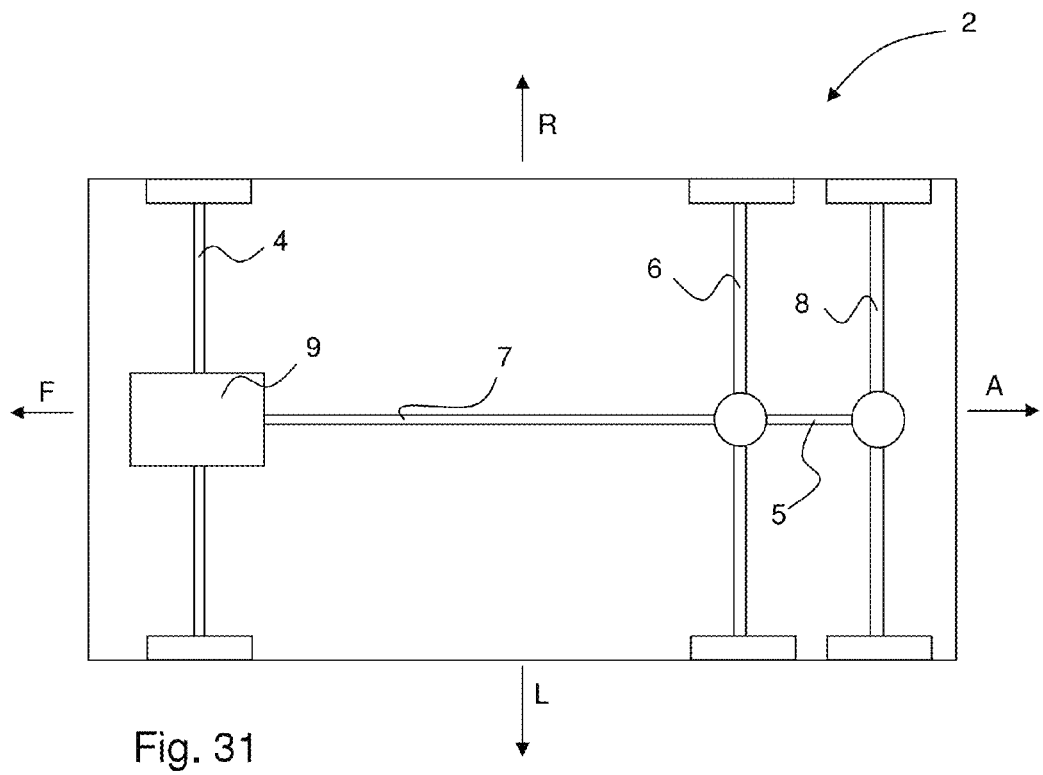
FIG. 31 is a schematic of the arrangement of axle assemblies on a heavy vehicle.
Figure 32:
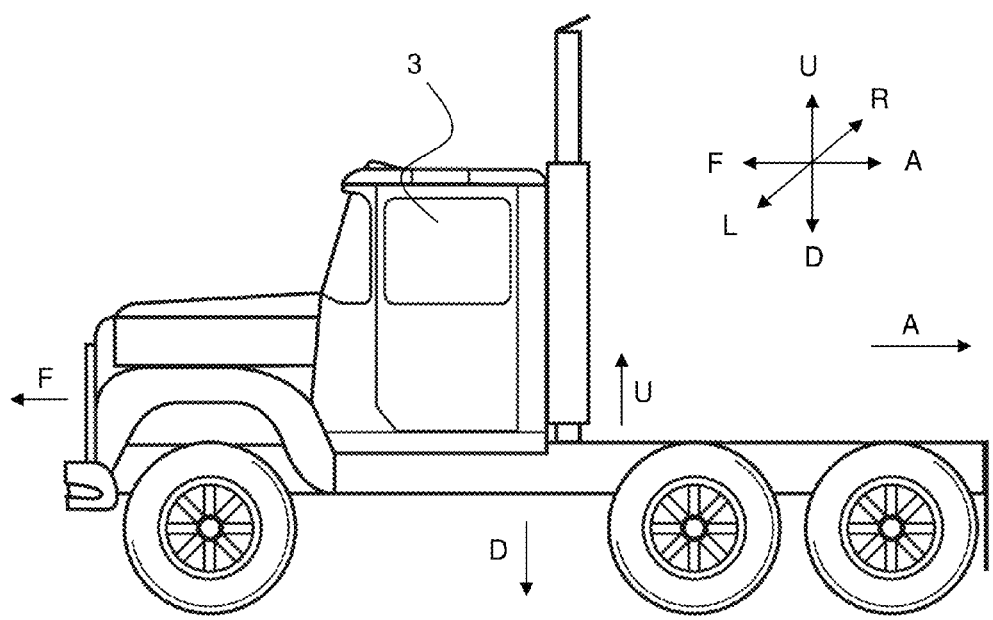
FIG. 32 is a schematic side view of the heavy vehicle.

Referring to FIGS. 31 and 32, a heavy vehicle is indicated generally at 2. Heavy vehicles often have a prime mover 9, for example an engine, at the front of the vehicle above a steered axle 4 that may or may not be driven by the prime mover. In addition to the axle assembly at the front of the vehicle, many heavy vehicles have two axle assemblies towards the rear of the vehicle, i.e. a rear tandem axle assembly. The following description will describe in more detail the rear tandem axle assembly and refer to the axle assembly of the tandem axle assembly, nearest the prime mover 9 as the fore axle assembly 6, and the axle furthest from the prime mover as the aft axle assembly 8. A drive shaft 7 is connected between the prime mover 9 and the fore axle assembly 6, and a connector shaft 5 is connected between the fore axle assembly 6 and the aft axle assembly 8. Reference to the positioning relative to the prime mover 9 is specific to certain embodiments and is not intended to limit the invention to this specific arrangement, and in other embodiments the prime mover may be in a different position. Additionally, the present invention may be applicable to a rear single axle assembly.

In the following description the fore direction F is the direction towards the front of the heavy vehicle 2 in the usual direction of travel and the aft direction A is the direction towards the rear of the heavy vehicle 2. The right direction R is the direction towards the right of the vehicle and the left direction L is the direction towards the left of the vehicle. The upward direction U is the direction from the axle assemblies towards a body 3 of the vehicle and the downward direction D is the direction from the axle away from the body of the vehicle (e.g. when travelling on the ground, the direction towards the ground).

Axle assemblies of the present invention will be described further below, and in each case the directions are described as though the axle assembly were positioned on the vehicle 2.

Figure 1:
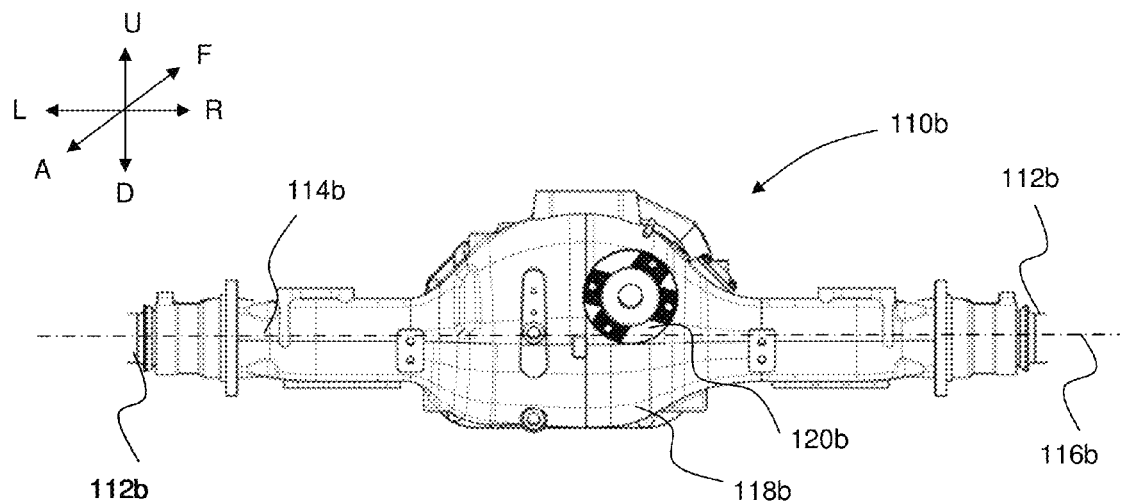
FIG. 1 is a rear view of a fore axle assembly of the prior art.
Figure 2:
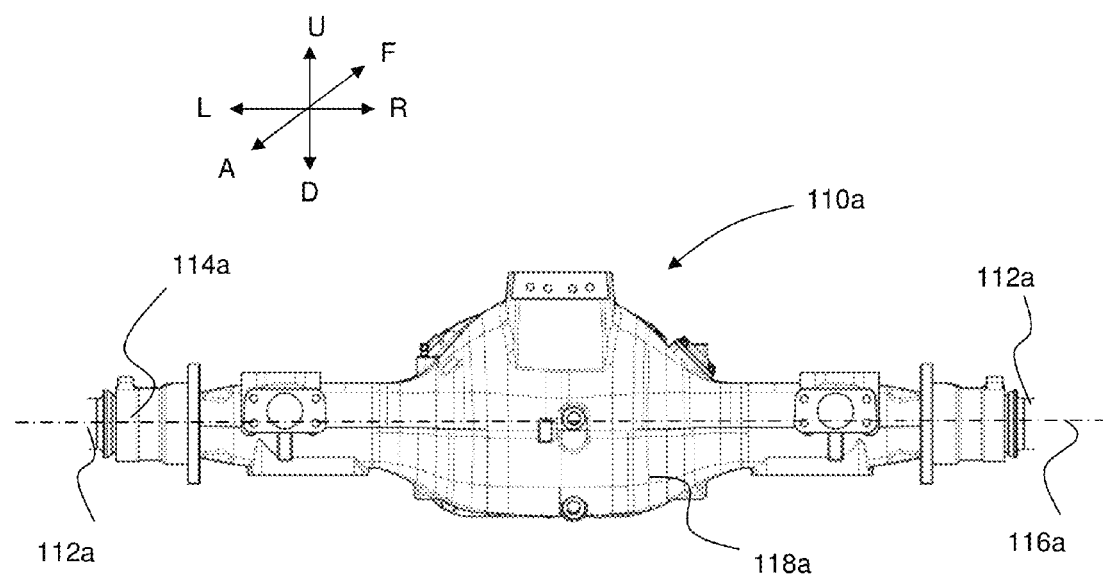
FIG. 2 is a rear view of an aft axle assembly of the prior art.

A fore axle assembly of the prior art is indicated generally at 110*b* in FIG. 1, and an aft axle assembly of the prior art is indicated generally at 110*a* in FIG. 2. Provided on the axis is a housing 118*a*, 118*b* within which is positioned differential gears (not shown), the housing being enlarged with respect to other components of the axle assembly. The housing 110*b* of the fore axle assembly has a coupling (not shown in the figures) for receiving a drive shaft from a prime mover (e.g. the prime mover 9 of FIGS. 31 and 32). The housing 110*b* of the fore axle assembly also has a coupling for a connector shaft that extends between the housing 110*b* of the fore axle assembly and a coupling (not shown) of the housing 110*a* of the aft axle assembly. The connector shaft transfers the drive from the drive shaft to the aft axle assembly. A half shaft 112*a*, 112*b* is positioned to the right R and the left L side of the housing 118a, 118b, and are surrounded in part by an axle casing 114a, 114b. The drive shaft provides the drive to rotate the half shafts 112a, 112b and as such the wheels of the vehicle when attached to the axle assembly are caused to rotate. The two half shafts within the axle casing define an axis 116a, 116b which extends in the longitudinal direction of the axle, i.e. along the axis of right R to left L.

Figure 3:
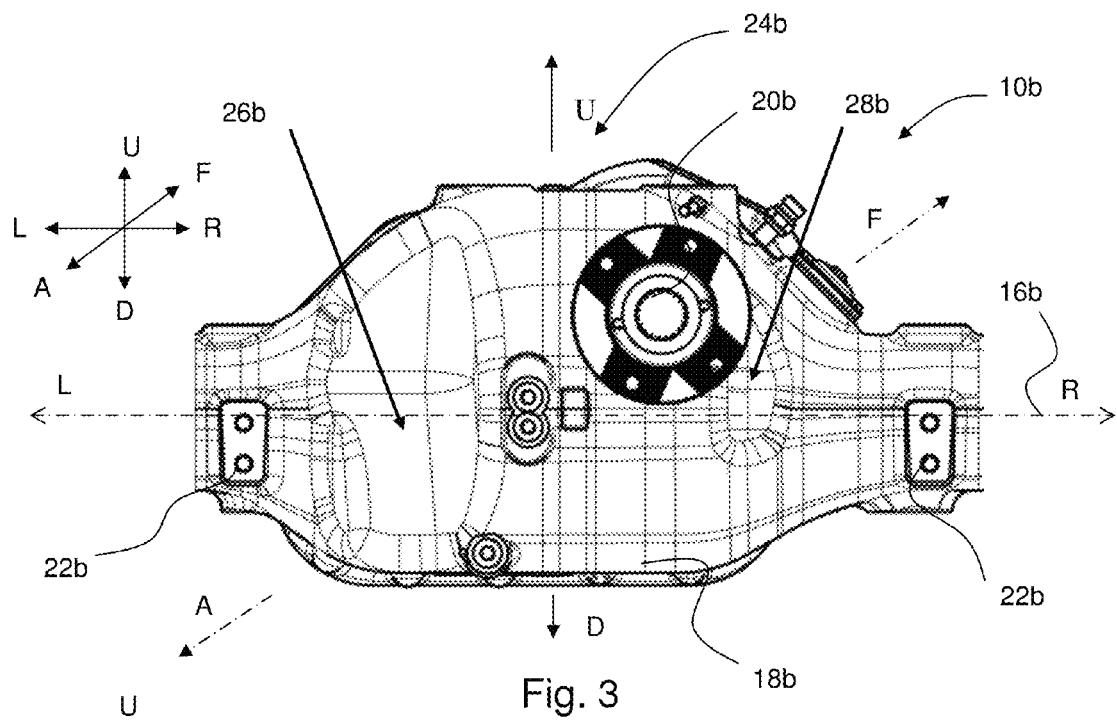
FIG. 3 is a rear view of a fore axle assembly according to an embodiment of the present invention.
Figure 4:
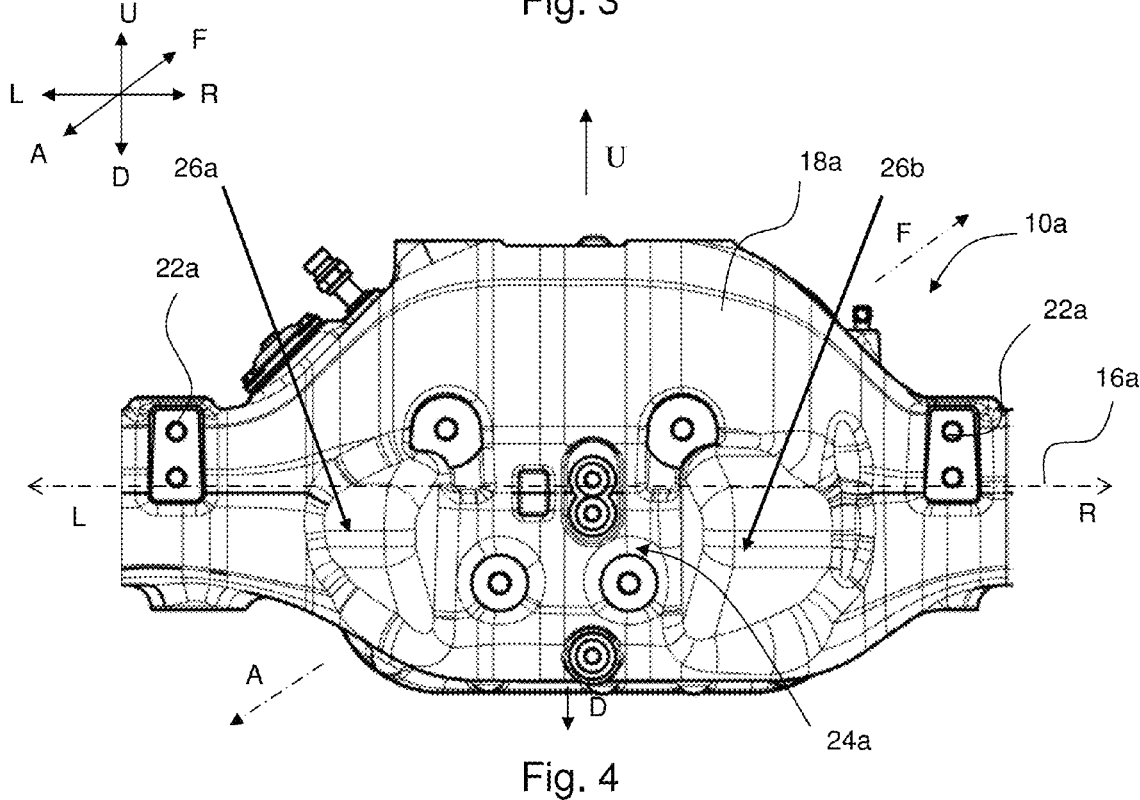
FIG. 4 is a rear view of an aft axle assembly according to an embodiment of the present invention.

Two housings for differential gears, each according to embodiments of the present invention, are shown in FIGS. 3 and 4. One of the housings is indicated generally at 10b in FIG. 3, and is intended for use on a fore axle assembly and the other housing is indicated generally at 10a in FIG. 4, and is intended for use on an aft axle assembly. The numbering of features in FIGS. 3 and 4 is similar, with a suffix of "a" indicating a feature of a housing intended for an aft axle assembly and a suffix of "b" indicting a feature of a housing intended for a fore axle assembly.

Referring to FIGS. 3 and 4 the housing 18a, 18b is a cast component and has four principal faces with rounded edges connecting between the faces in a circumferential direction. Two of the faces are positioned along the fore-aft axis, and extend along the upward-downward axis and the right-left axis. One face is positioned to the fore of the housing (the fore face) and one face is positioned to the aft of the housing (the aft face). A further two faces of the housing are positioned along the upward-downward axis and extend in the direction of the fore-aft axis and right-left axis. One of the faces is positioned on the upward side of the housing (the upward face) and the other face is positioned on the downward side of the housing (the downward face).

A longitudinal axis 16b, 16a defined by the half axle shafts of the axle assembly 10b, 10a extends longitudinally through the housing 18a, 18b.

Figure 17:
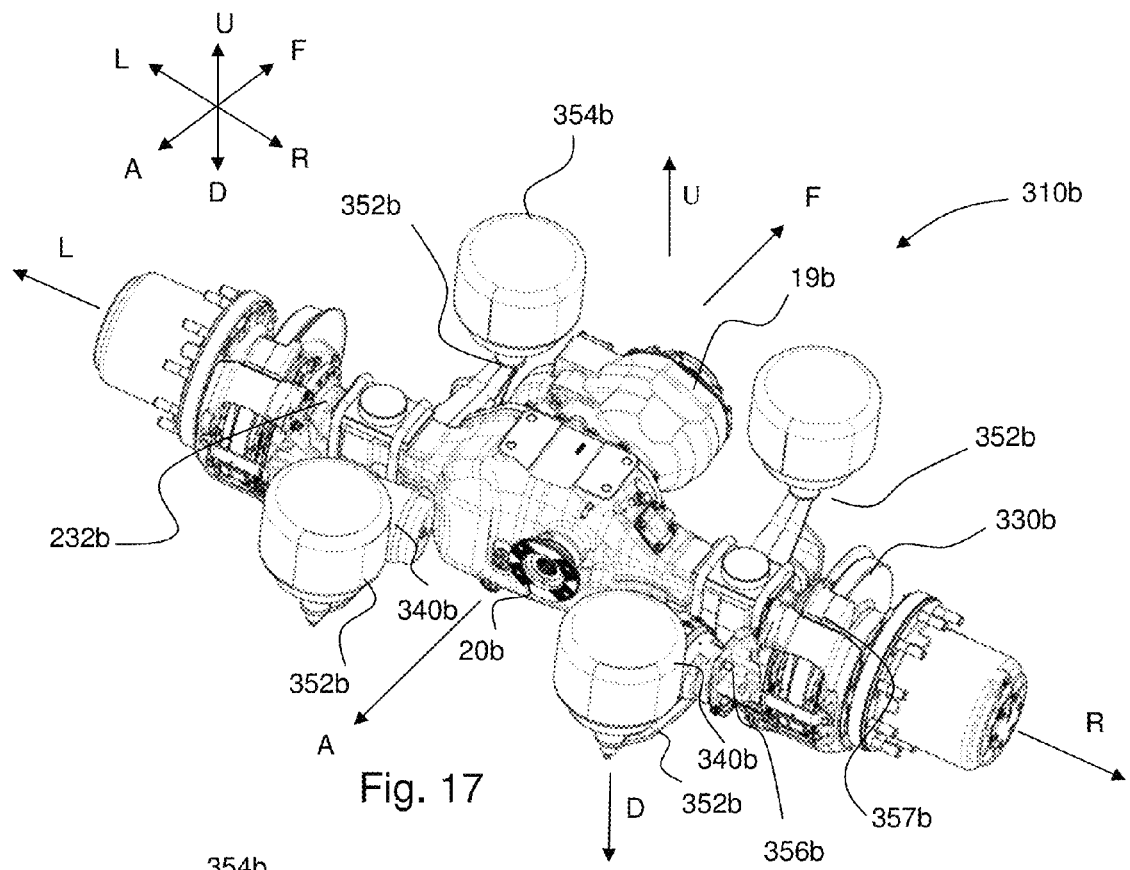
FIG. 17 is a perspective view of the fore axle assembly of FIG. 3 when the axle assembly comprises two disc brakes.
Figure 18:
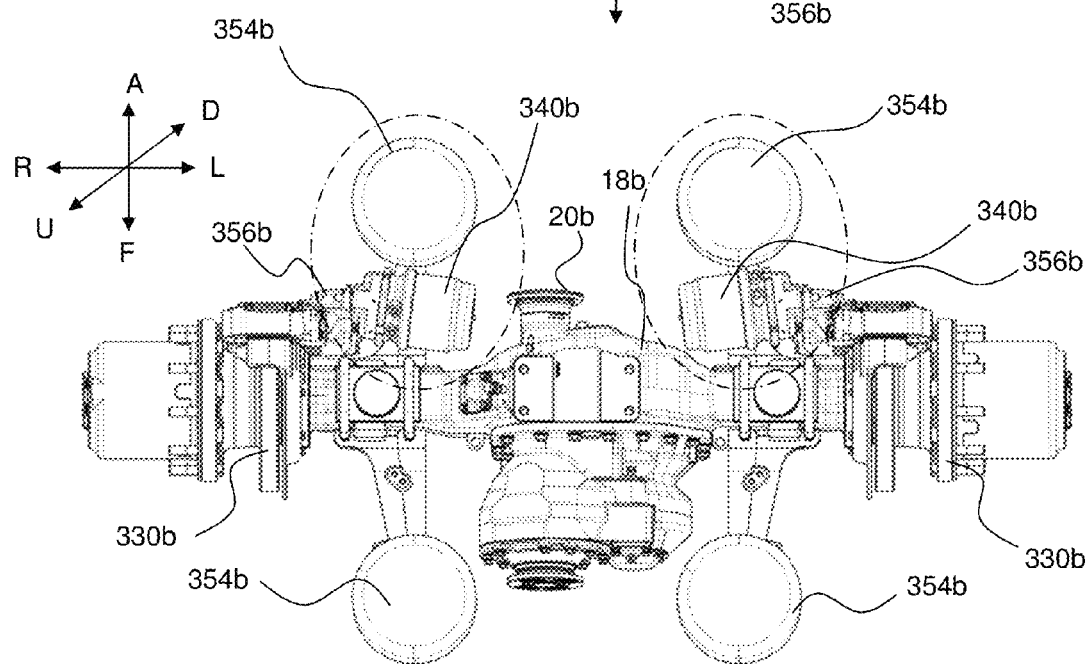
FIG. 18 is a plan view of the fore axle assembly of FIG. 17.
Figures 19, 20:
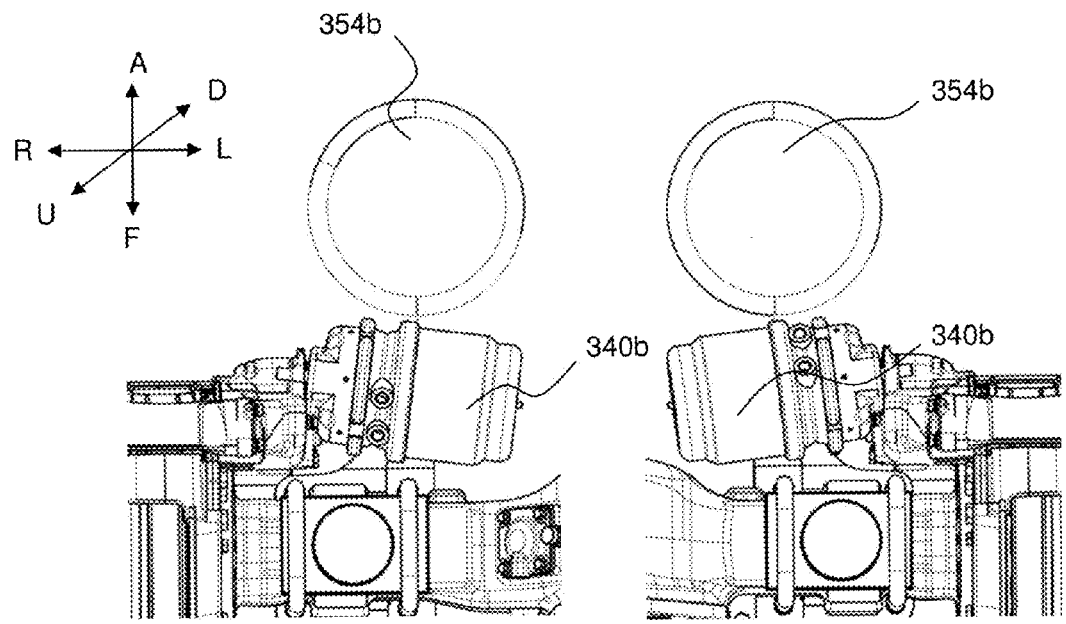
FIG. 19 is a view of an air chamber and air bag of the fore axle assembly of FIG. 17.
FIG. 20 is a view of an air chamber and air bag of the fore axle assembly of FIG. 17.

Now referring to FIG. 3, the housing 18b of the fore axle assembly 10b will be described in more detail. The fore face of the housing 18b has a coupling (not shown in FIG. 3, but indicated at 19b in FIG. 17) for connection of the axle assembly to a drive shaft from a prime mover. The aft face of the housing 18b has a drive coupling 20b for connecting a connector shaft between the fore axle assembly and the aft axle assembly (similar to that described for the prior art) so as to transfer drive from the drive shaft to the aft axle assembly. In this embodiment, the coupling 20b is positioned in a region of the fore face that is towards the upward side of the face and towards the right side of the face.

The housing 18b reduces in diameter at the left-most and right-most extents of the housing. At the left-most and right-most extent of the housing and on the same side of the axle assembly as the fore face of the housing are positioned two actuation shaft mounts 22b. The actuation shaft mounts 22b may be positioned on the housing or on another component of the axle assembly, e.g. an axle casing. In this embodiment, the actuation shaft mounts are also on the same side of the axle assembly as the downward side of the aft face of the housing. In use, an actuation shaft may be mounted to the actuation shaft mount via a bracket (described in more detail later).

An air cylinder mount 24b is positioned on the upward-face of the housing. In use, one or more air cylinders are mounted to the housing at the air cylinder mount via a bracket (described in more detail later).

Contrary to housings of the prior art, the housing 10b of the present invention has two depressions 26b, 28b formed in the aft face. One of the depressions 26b is towards the left-most side of the aft face, near one of the actuation shaft mounts, and the other depression 28b is towards the right-most side of the aft face, near the other actuation shaft mount.

Figure 5:
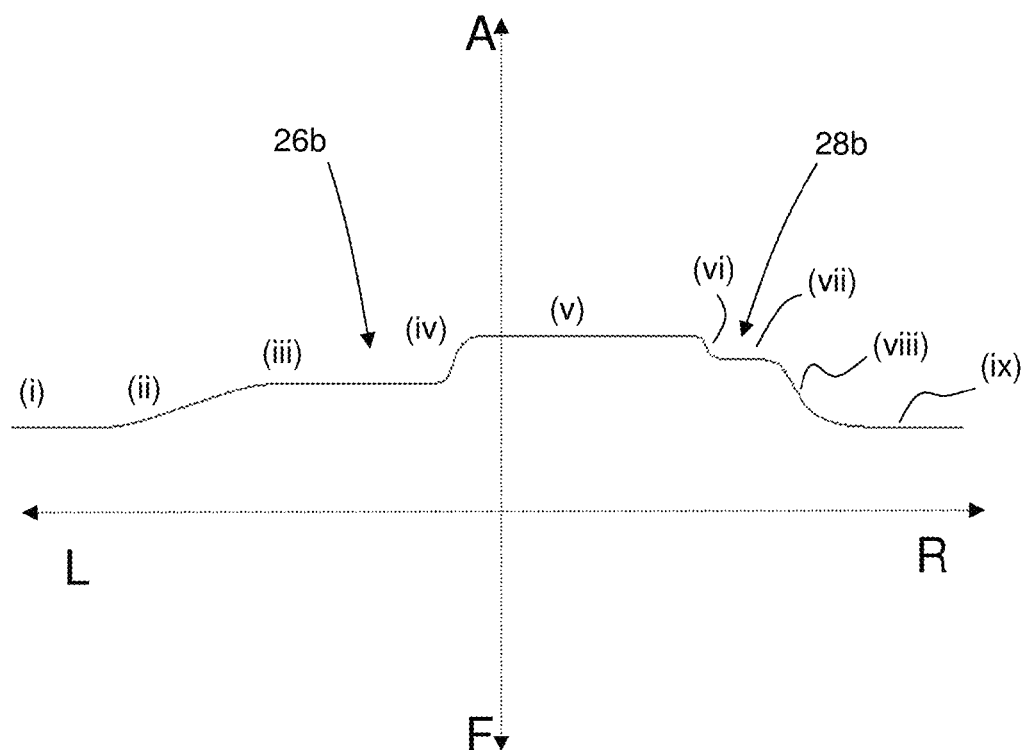
FIG. 5 is a schematic profile plot of an aft face of a housing of the axle assembly of FIG. 3.

FIG. 5 shows a general profile (not to scale) of the profile of the aft face of the housing from left to right, directly through the centre of the depressions 26b and 28b. The F-A axis of FIG. 5 indicates the deviation of the profile in the fore-aft direction. Referring to FIGS. 3 and 5, it can be seen that the fore face is profiled such that the diameter is narrowest at the left-most (i) and right-most (ix) sides of the aft face. When viewed from left to right, the diameter gradually increases (ii) from the left-most region (i) of the aft face to the base (iii) of the depression 26b. The diameter then again increases (iv), with a steeper gradient, to the aft-most surface (v) of the aft face. Then at a position towards the right-most side of the aft face, the diameter decreases (vi) to a base (vii) of depression 28b. The diameter then further decreases (viii) to connect with the right-most (ix) side of the aft face.

It can be seen from FIGS. 3 and 5 that the progression from the base (iii) of the depression 26b to the aft-most region (iv) of the aft face is concave, and also from the base (vii) of the depression 28b to the aft face to the aft-most portion (iv) of the aft face is concave.

Referring to FIG. 3, it can be seen that the depression 26b at the left-most side of the aft face extends across the aft face in the upward-downward direction to the extremities of the aft face. The depression 28b at the right-most side of the aft face also extends in the upward-downward direction, but only extends across a portion of the aft face. The progression from the aft-most region of the aft face to the base of the depression 28b is concave in the upward-downward direction as well as in the left-right direction. The depression 28b is further extended in the upward direction, with a gradually increasing diameter from the base of the depression to a position where the depression 28b meets or is near to the coupling 20b.

Now referring to FIG. 4, the housing 18a of the aft axle assembly 10a will be described in more detail. The fore face of the housing 18a has a coupling (not shown in FIG. 4, but shown in FIG. 28 at 19a) for receiving a connector shaft from the fore axle assembly (similar to that described for the prior art).

The aft face of the housing 18a has an air cylinder mount 24a positioned centrally along the left-right axis of the housing and near to the downward side of the aft face. The air cylinder mount 24a, in use, mounts a bracket for connecting one or more air cylinders to the housing.

The housing 18a reduces in diameter at the left-most and right-most extents of the housing. At the left-most and right-most extent of the housing and on the aft face are positioned two actuation shaft mounts 22a. In this embodiment, the actuation shaft mounts are on the upward side of the aft face. In use, an actuation shaft is mounted to the actuation shaft mount via a bracket (described in more detail later).

Contrary to housings of the prior art, the housing 18a of the present invention has two depressions 26a, 28a formed in the aft face. One of the depressions 26a is towards the left-most side of the aft face, near one of the actuation shaft mounts, and the other depression 28a is towards the right-most side of the aft face, near the other actuation shaft mount.

Figure 6:
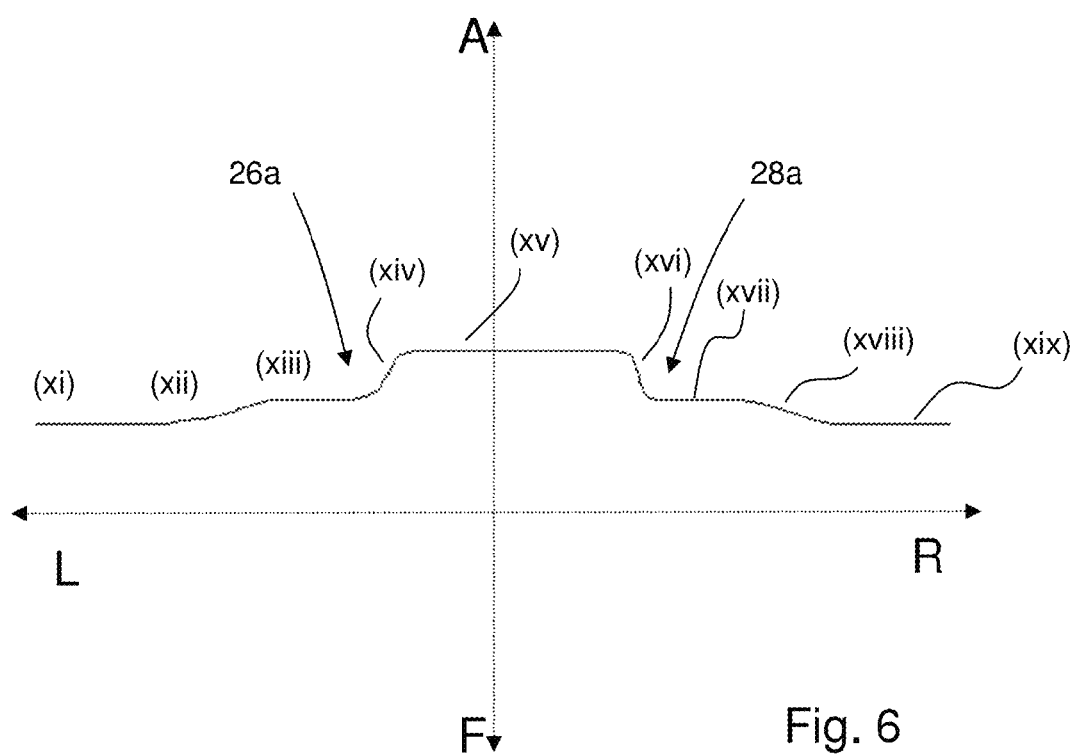
FIG. 6 is a schematic profile plot of an aft face of a housing of the axle assembly of FIG. 4.
Figure 7:
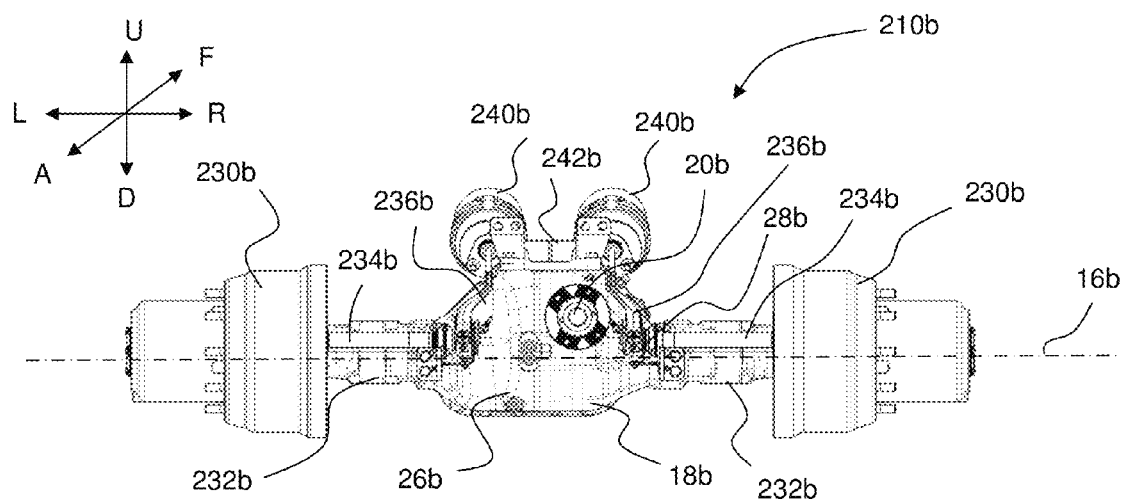
FIG. 7 is a rear view of the fore axle assembly of FIG. 3 comprising two drum brakes.
Figure 8:
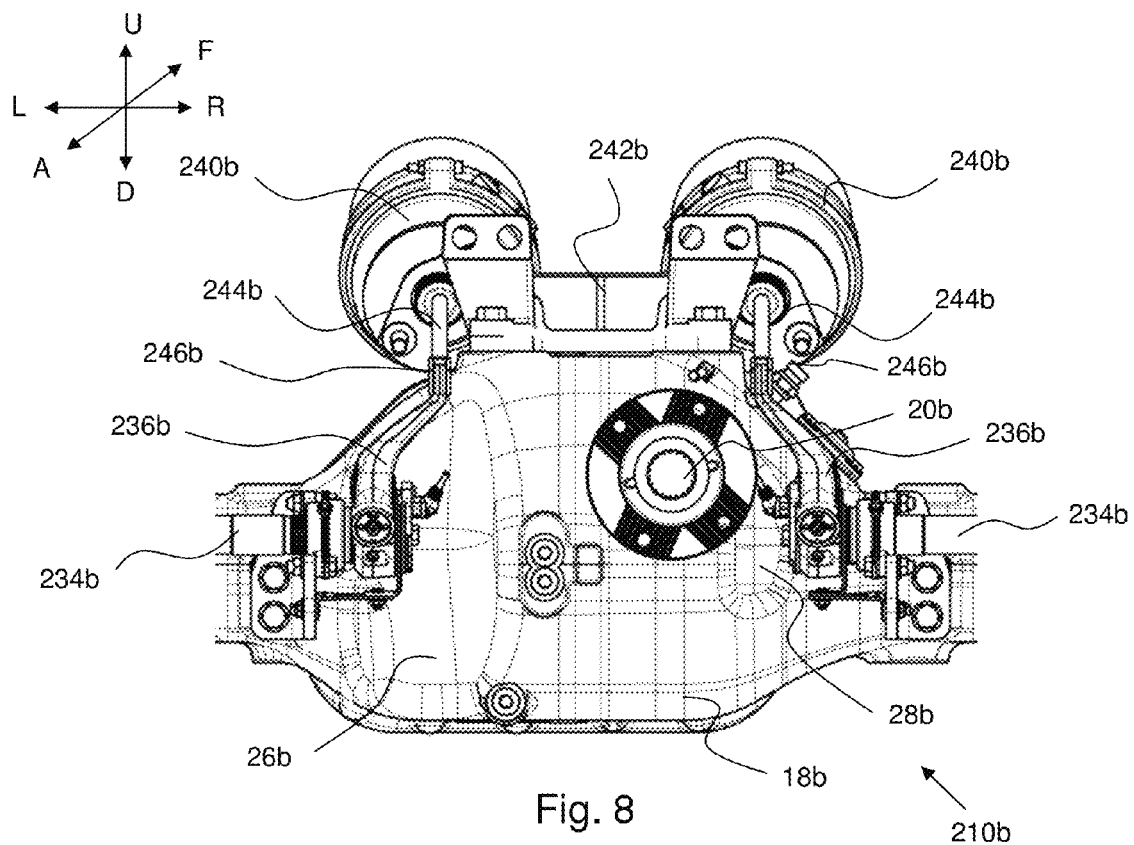
FIG. 8 is a rear view of the fore axle assembly of FIG. 7.

FIG. 6 shows a general profile (not to scale) of the profile of the aft face of the housing 18a from left to right, directly through the centre of the depressions 26a and 28a. The F-A axis in FIG. 6 indicates the deviation of the profile in the fore-aft direction. Referring to FIGS. 4 and 6, it can be seen that the aft face is profiled such that the diameter is narrowest at the left-most (xi) and right-most (xix) side of the aft face. When viewed from left to right, the diameter gradually increases (xii) from the left-most (xi) region of the aft face to the base (xiii) of the depression 26a. The diameter then again increases (xiv), with a steeper gradient, to an aft-most surface (xv) of the aft face. Then at a position towards the right-most side of the aft face, the diameter decreases (xvi) to a base (xvii) of depression 28a. The diameter then further decreases (xviii) to connect with the right-most (xix) side of the aft face.

It can be seen from FIGS. 4 and 6 that the progression from the base (xiii) of the fore face to the fore-most surface (xiv) of the fore face is concave, and also from the base (xvii) of the depression 28a to the fore-most surface (xiv) of the fore face is concave.

Referring to FIG. 4, it can be seen that the depression 26a at the left-most side of the aft face extends across approximately half of the aft face in the upward-downward direction, and extends from the downward-most side of the aft face towards the position of the axis 16a of the housing. Similarly, the depression 28a at the right-most side of the aft face extends across approximately half of the aft face in the upward-downward direction, and extends from the downward-most side of the aft face towards the position of the axis 16a of the housing.

The progression from an aft-most surface of the aft face to the base of each depression 28a and 28b is concave in the upward-downward direction as well as in the left-right direction.

The housing 18b in a fore axle assembly is shown in FIGS. 7 to 11. In this embodiment, the fore axle assembly comprises two drum brakes 230b at the left most end and right most end of the axle assembly mounted to the axle assembly via a hub at each end of the axle assembly (hidden in the Figures due to the presence of the drum brakes). The housing 18b is positioned centrally on the axle assembly and connected to two half axle shafts one on each side. The axle half shafts are positioned within an axle casing 232.

The drum brake 230b in many embodiments has a pair of brake shoes moveable between an applied position and a released position. The applied position causing a wheel connected to the drum brake to brake, and the released position permitting free rotation of a wheel connected to the drum brake. An actuation shaft 234b is rotatable about an axis along the longitudinal direction of the actuation shaft. An actuation device, for example an s-cam, transfers rotational movement of the actuation shaft 234b into movement of the brake shoe from the released position to the applied position. A slack adjuster 236b is connected to the actuation shaft 234b via a splined connection 238b, and is operable to account for wear of the brake shoes in a known manner.

Two air cylinders 240b are mounted to the housing 18b at the air cylinder mount 24b via a bracket 242b. A rod 244b extends from each air cylinder. In normal use, i.e. not during maintenance, each rod 244b attaches to a free end of one of the slack adjusters 236b. The air cylinders are operable to transfer movement via the rod 244b and the slack adjuster 236b to the actuation shaft 234b so as to actuate the brake shoe to an applied position.

In the present embodiment, the slack adjuster 236b is cranked and connects between the rod 244b and the actuation shaft 234b. The crank accounting for the fact that the rod 244b is further towards the centre of the housing, along the left-right axis, than the actuation shaft 234b. In alternative embodiments, the slack adjuster may not be cranked. The slack adjuster 236b connects to the rod 244b via a c-shaped connector 246b at the end of the rod. A pin (not shown) goes through the c-shaped connector and the slack adjuster 236b to secure the connection. The slack adjusters 236b are positioned such that they are within a space created by the depressions 26b, 28b formed in the housing 18b.

Figure 9:
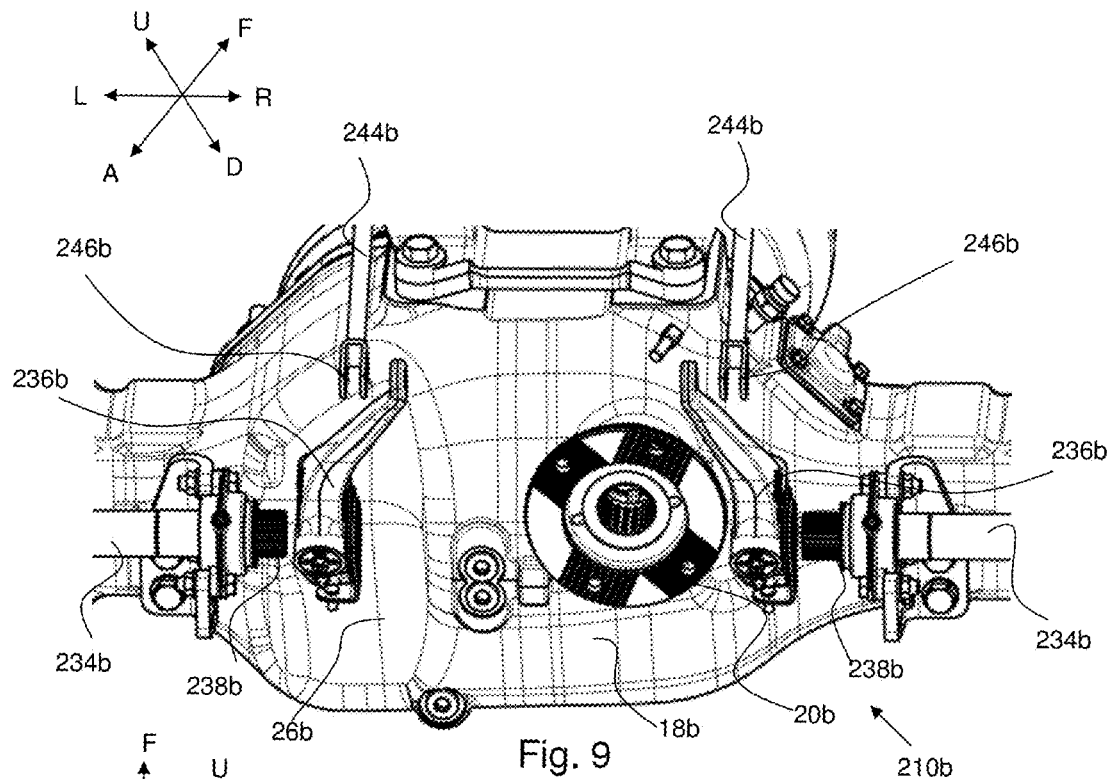
FIG. 9 is a view of an aft and upward side of the axle assembly of FIG. 7.
Figure 10:
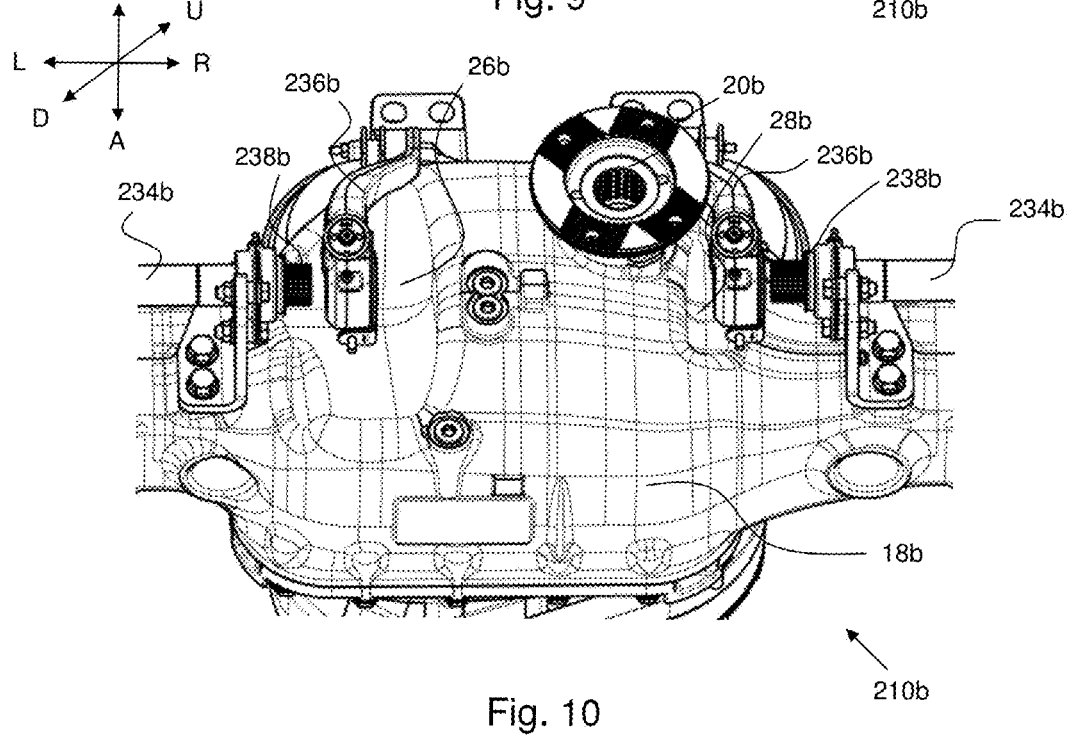
FIG. 10 is a view of an aft and upward side of the axle assembly of FIG. 7.
Figure 11:
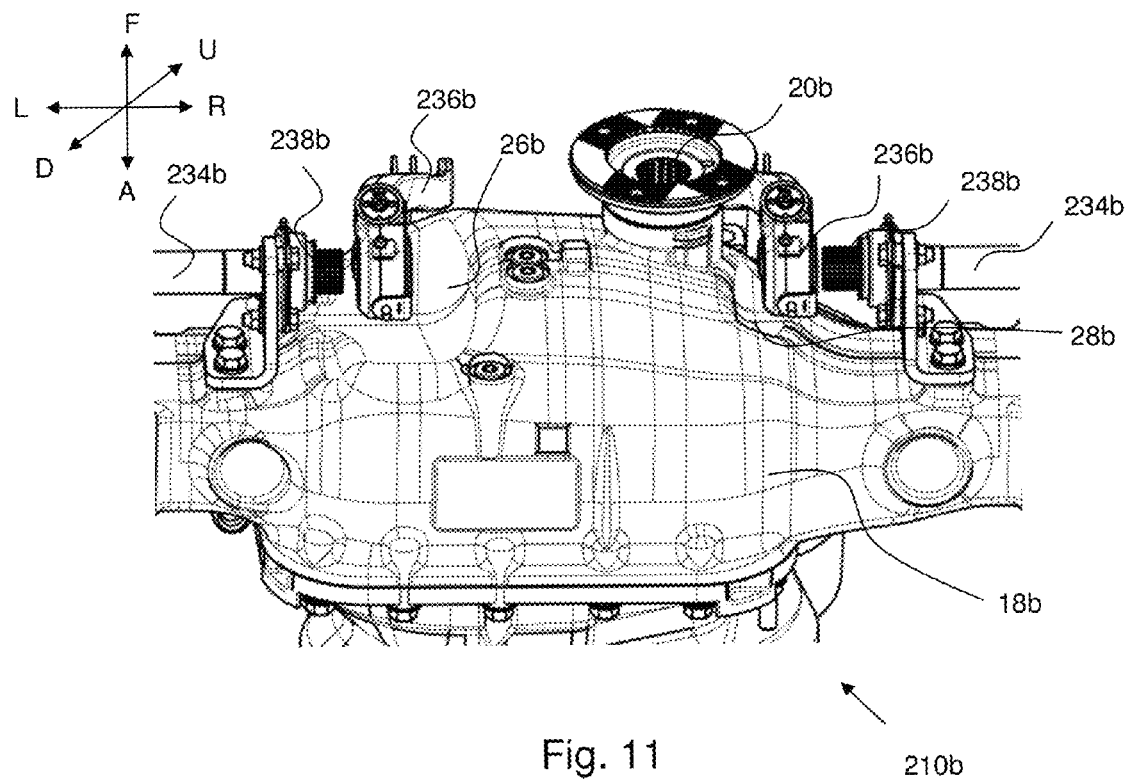
FIG. 11 is a view from a downward direction of the axle assembly of FIG. 7.
Figure 12:
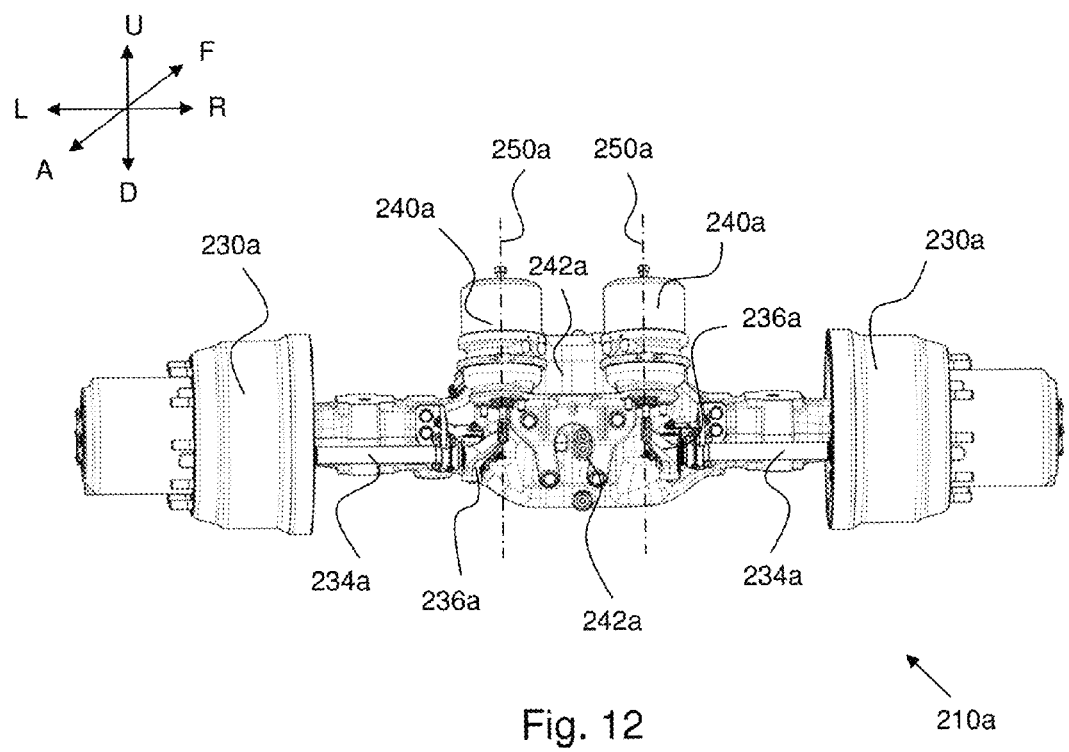
FIG. 12 is a rear view of the aft axle assembly of FIG. 4 comprising two drum brakes.
Figure 13:
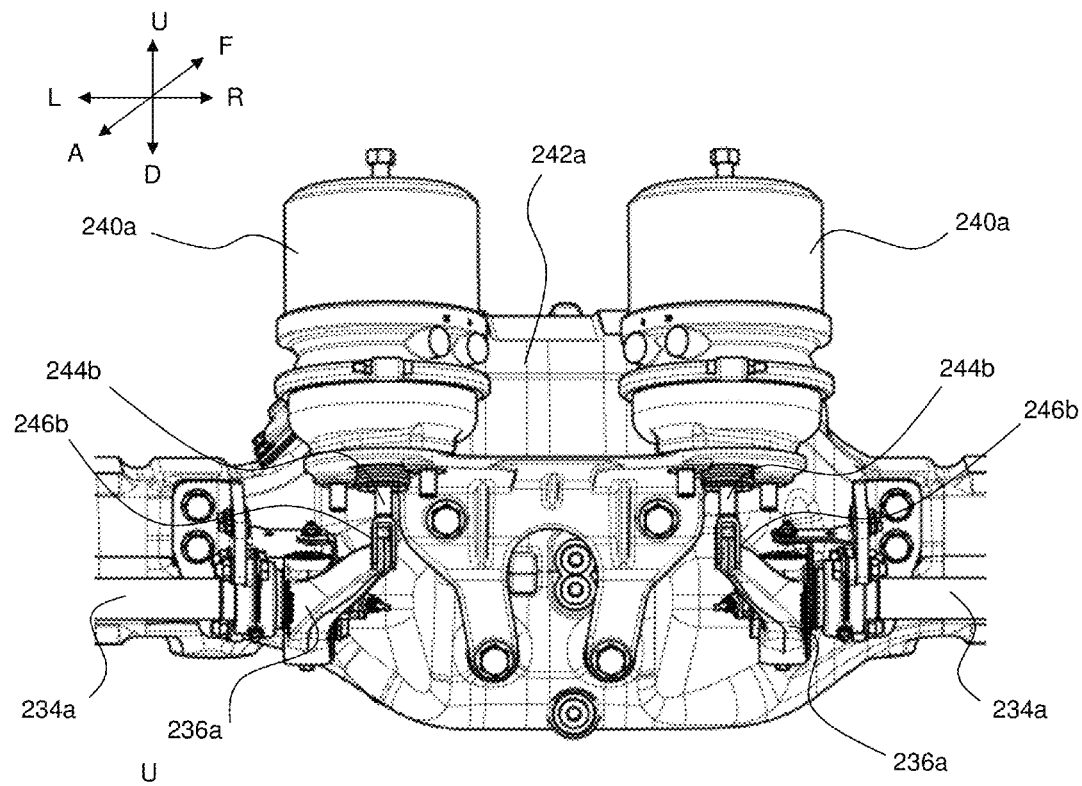
FIG. 13 is a rear view of the aft axle assembly of FIG. 12.
Figure 14:
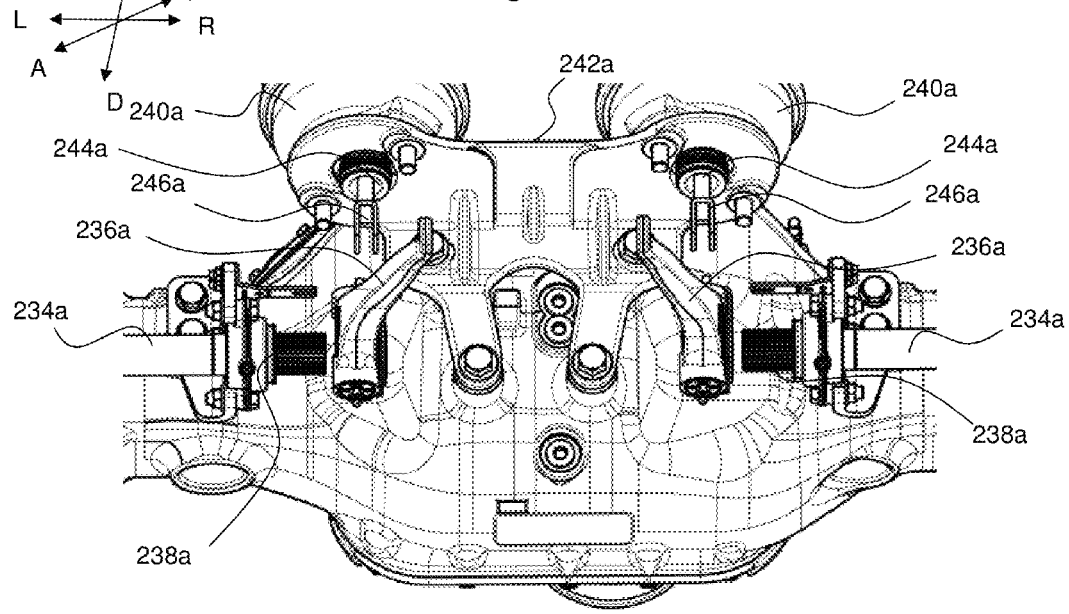
FIG. 14 is a view of an aft side and a downward side of the aft axle assembly of FIG. 12.
Figure 15:
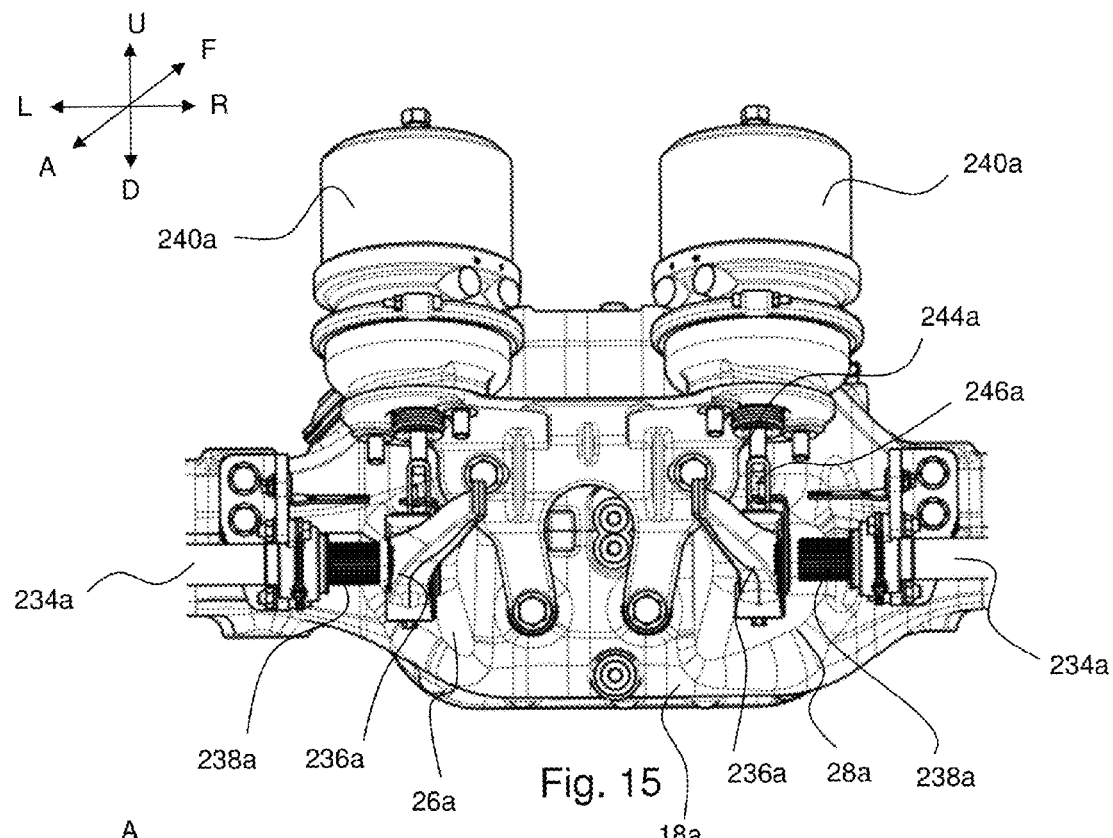
FIG. 15 is a rear view of an aft axle assembly of FIG. 12.
Figure 16:
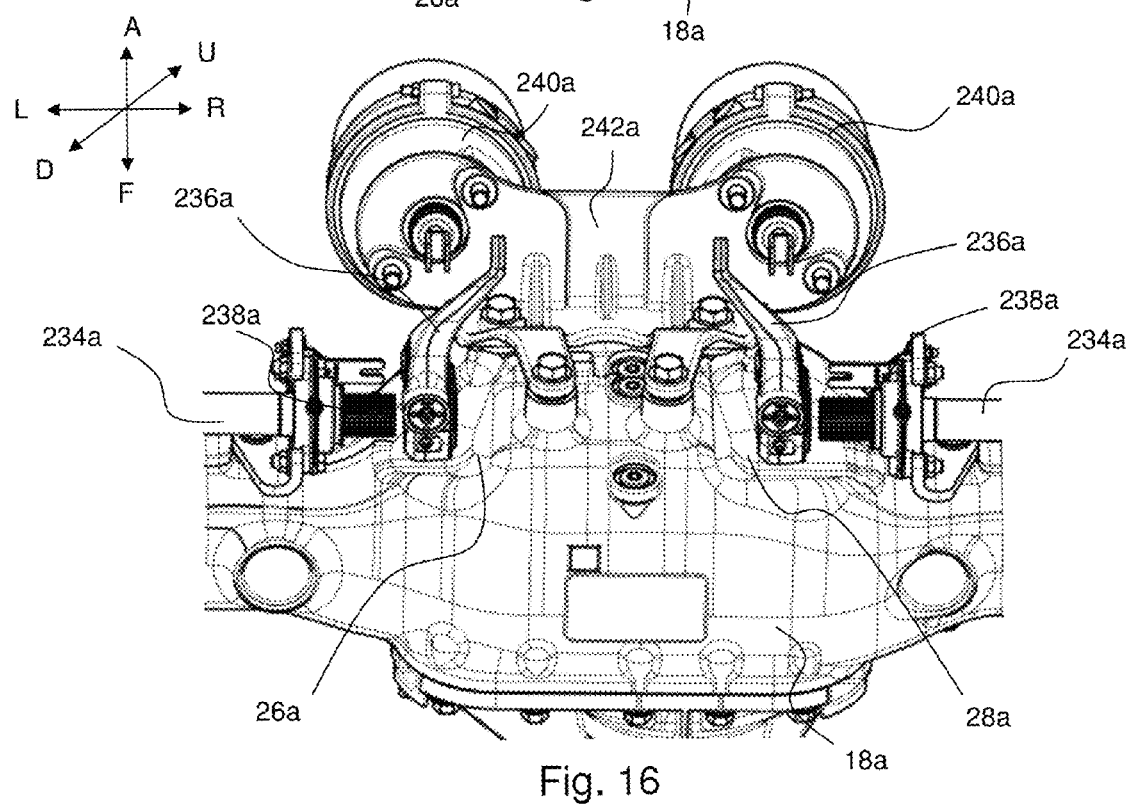
FIG. 16 is a view from a downward direction of FIG. 12.

The slack adjuster 236b may need replacing or removing so as to permit maintenance. To disconnect the slack adjuster 236b from the axle assembly 210b the pin is removed from the c-shaped connector 246b and slack adjuster 236b. The slack adjuster 236b is then moved out of engagement with the c-shaped connector 246b. Once the slack adjuster 236b is disengaged from the c-shaped connector, the slack adjuster 236b can be slid along the splined connection 238b of the actuation shaft to an extent that the slack adjuster 236b disconnects with the actuation shaft 234b. That is, the slack adjuster 236b on the left side of the housing 18b is moved towards the right side of the housing, and the slack adjuster on the right side of housing 18b is moved towards the left side of the housing. Once disconnected from the actuation shaft the slack adjuster can be simply removed. The axle assembly with the slack adjuster in a disconnected position is shown in FIGS. 9 to 11.

To reconnect a slack adjuster 236b or connect a new slack adjuster, the above procedure is followed in reverse. That is, the slack adjuster is slid on to the splined connection 238b of the actuation shaft so as to connect to the actuation shaft 234b. The slack adjuster is then moved to engagement with the c-shaped connector of the rod, and the pin is positioned between the slack adjuster and c-shaped connector so as to connect the rod and the slack adjuster.

The depressions 26b and 28b permit the slack adjuster 236b to be disconnected from the actuation shaft 234b without the need to remove any other components (except the pin that connects the slack adjuster to the rod) of the axle assembly 210b. This is advantageous over housings of the prior art. In housings of the prior art it is necessary to remove the wheel, the drum, the brake shoes and move the actuation shaft so as to assemble/disassemble the slack adjuster. This is time consuming and therefore inconvenient for a user.

The housing 18a in an aft axle assembly 210a is shown in FIGS. 12 to 16. In this embodiment, the aft axle assembly comprises two drum brakes 230a at the left most end and right most end of the axle assembly. The aft axle assembly has many features in common with the fore-axle assembly 210b. The common features will not be described further.

In this embodiment, two air cylinders 240a are attached to the aft face of the housing 18a at the air cylinder mount 24a via a bracket 242a. The air cylinders are arranged such that the longitudinal axis 250a of each air cylinder is substantially parallel to the upward-downward axis.

As with the housing 18b of the fore axle assembly 210b, the axle assembly has slack adjusters 236a positioned within the depressions 26a and 28a of the housing, and connected between an actuation shaft 234a and a rod 244a that connects to the air cylinders 240a.

The slack adjuster 236a is removed and reconnected in a similar way to that described for the fore axle assembly and the same advantages in terms of ease of assembly and disassembly of the slack adjuster are achieved.

The housing 18b in a fore axle assembly is shown in FIGS. 17 to 23. In this embodiment, the fore axle assembly 310b comprises two disc brakes 330b at the left most end and right most end of the axle assembly instead of the drum brakes shown previously. The housing 18b is connected centrally to the axle assembly 310b, such that it connects to both half shafts of the axle assembly (similar to the half shafts discussed for the prior art axle assembly).

Associated with each disc brake is an air chamber 340b. The air chambers are both positioned on the aft side of the axle assembly, with one being positioned near the left side of the housing (i.e. close to one of the disc brakes) and the other being positioned near the right side of the housing (i.e. close to the other disc brake). Each air chamber is mounted to a caliper 356b of the disc brake which is in turn mounted on a carrier 357b that is secured to the axle casing 232b.

In this embodiment, a suspension system of the axle assembly is also illustrated. The previously described embodiments also utilised a suspension system, but it was not illustrated as it is not pertinent to the function of the invention. The suspension system comprises four suspension arms 352b. A pair of suspension arms is connected to the axle casing to the left of the housing. One of the arms of the pair extends from the position of the axle casing substantially in the aft direction and one substantially in the fore direction. The other pair of suspension arms are connected to the axle casing to the right of the housing. One arm of each pair extends from the position of the axle casing substantially in the aft direction and one substantially in the fore direction. Each pair of suspension arms are connected to the axle casing using two u-shaped brackets. The brackets extend around the axle casing and bolt to a plate that is positioned on the downward side of the pair of suspension arms.

Connected to the upward side of each suspension arm is a cylindrically shaped air bag 354b. The air bags 354b are positioned and designed so as to absorb undulations in the road and minimise transfer of such undulations to an user of the vehicle. The pneumatic system of the vehicle may be arranged such that a compressor and reservoir of air supplies both the air chambers and the air bags with the required air supply.

The housing 18b of the present embodiment permits the air chambers 340b to be angled towards the longitudinal axis of the axle assembly, that extends in the right-left direction, i.e. the air chambers 340b are arranged at a negative angle with respect to the longitudinal axis of the axle assembly.

Figure 33:
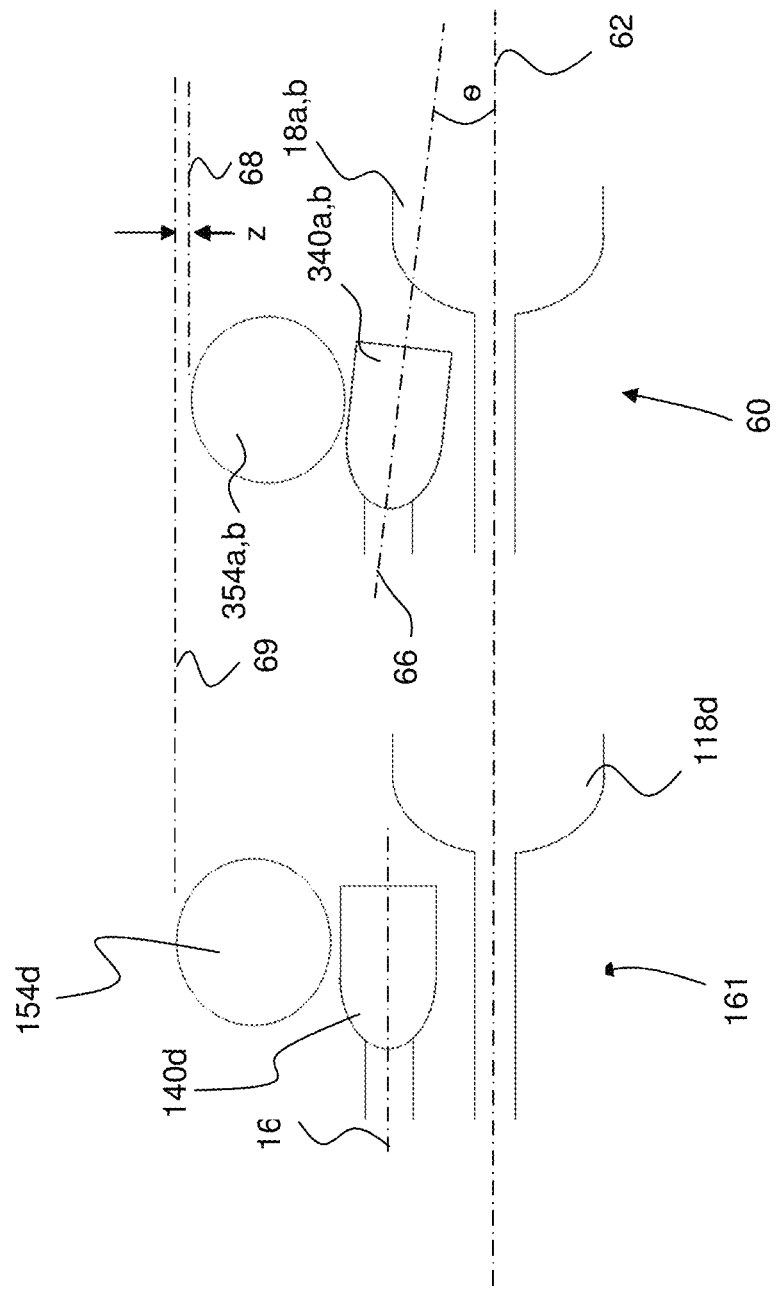
FIG. 33 is a schematic comparison of the positioning of an air chamber and air bag of the prior art compared to the axle assembly of FIGS. 17 to 30.

The angled position of the air chamber is illustrated at 60 in FIG. 33. For comparison, the air chamber and airbag arrangement of an assembly of the prior art is illustrated at 161 in FIG. 33.

In axle assemblies of the prior art, the air chamber 140d is substantially parallel to the longitudinal axis 62 of the axle assembly.

The air chambers 340a, b of the axle assemblies of embodiments of the present invention are angled towards the housing, such that a longitudinal axis 66 extending through the longitudinal length of an air chamber forms an acute angle with the longitudinal axis 62 when measured in a clockwise direction from the longitudinal axis. The described negative angling of the air chamber means that a tangent 68 to the air bag 354a, b of an embodiment of the present invention is closer to the longitudinal axis than a tangent 69 to an air bag 154 of the prior art 161 by a distance Z. Thus the axle assembly is more compact than axle assemblies of the prior art in a fore-aft direction.

In use, as friction material and a brake disc of the disc brake wear, the brake caliper moves to account for the wear. Accordingly, the air chambers 340b also move. The movement of the brake caliper and the air chambers is towards the housing 18b of the axle assembly.

Figure 21:
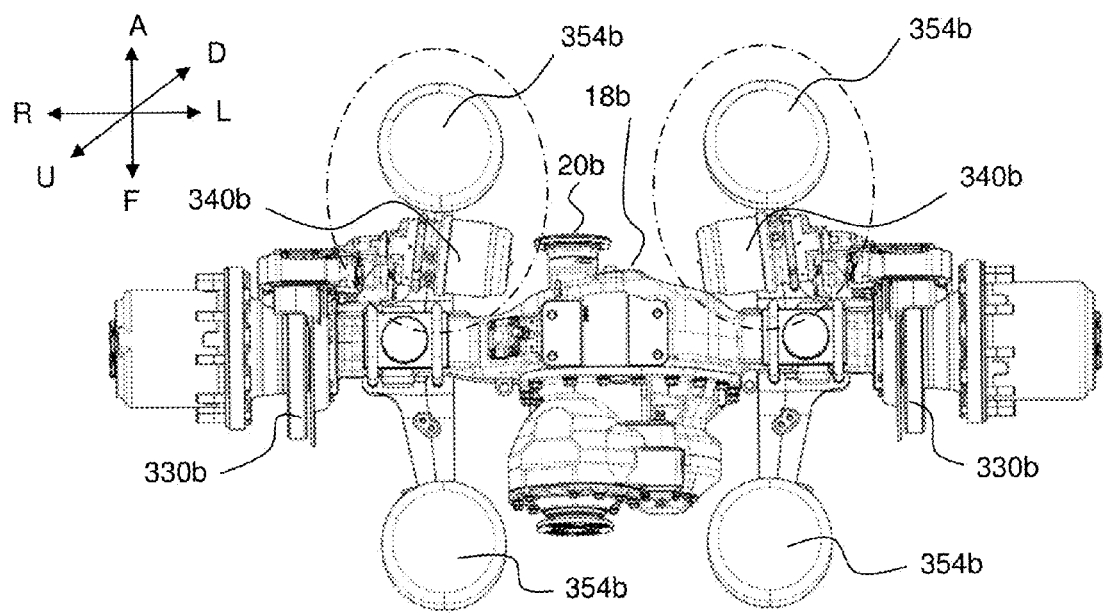
FIG. 21 is a plan view of the fore axle assembly of FIG. 17 in a worn condition.
Figures 22, 23:
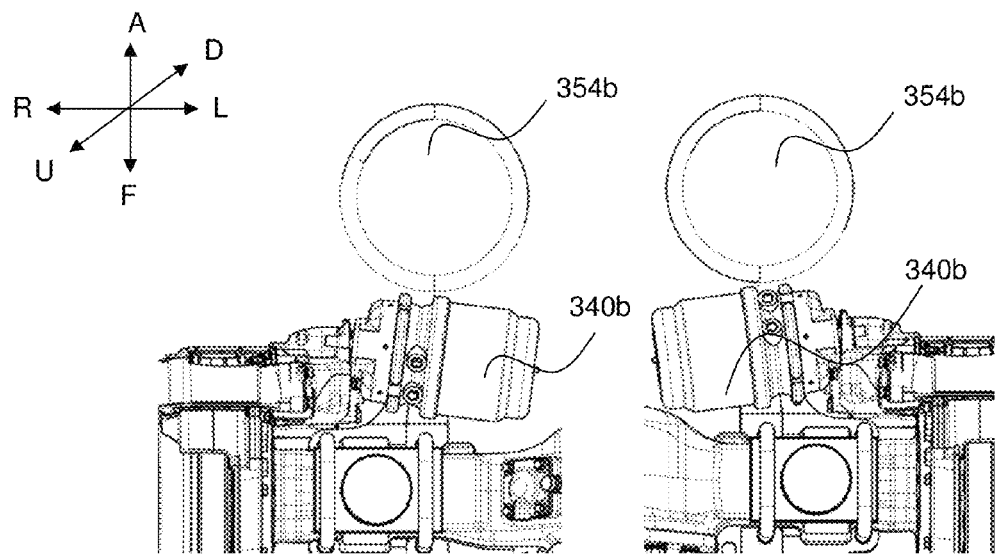
FIG. 22 is a view of an air chamber and air bag of the fore axle assembly of FIG. 21.
FIG. 23 is a view of an air chamber and air bag of the fore axle assembly of FIG. 21.
Figure 24:
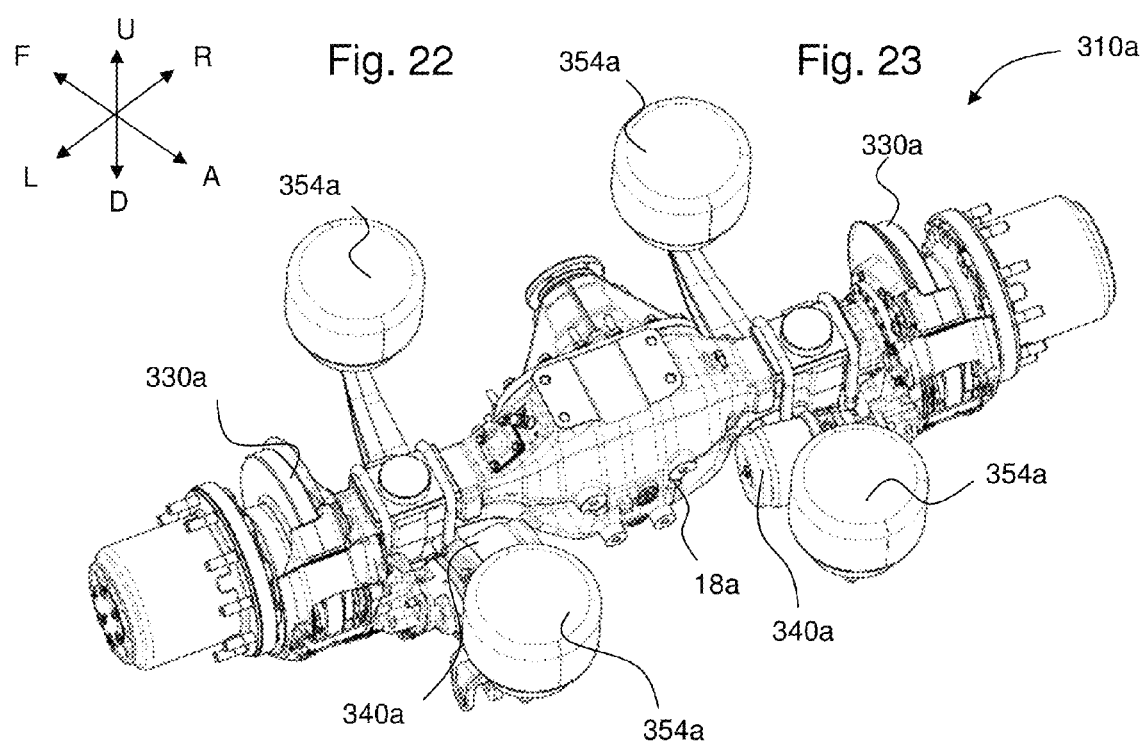
FIG. 24 is a perspective view of an aft axle assembly of FIG. 4 when the axle assembly comprises two disc brakes.
Figure 25:
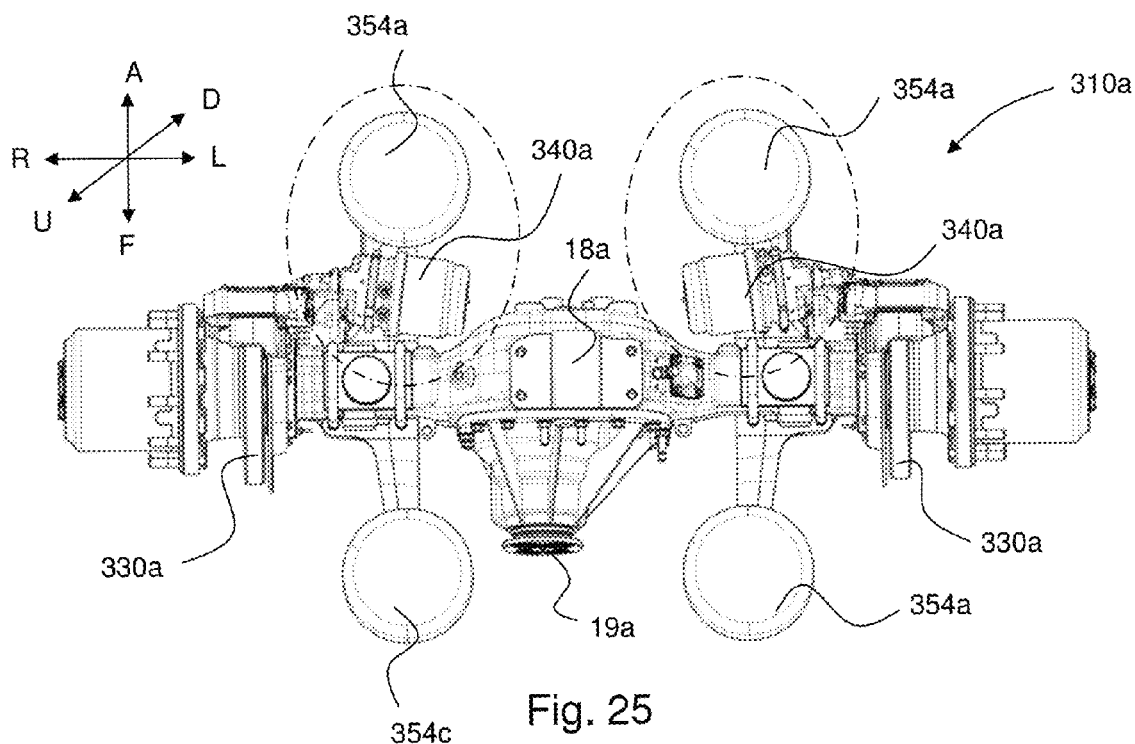
FIG. 25 is a plan view of the aft axle assembly of FIG. 24.
Figures 26, 27:
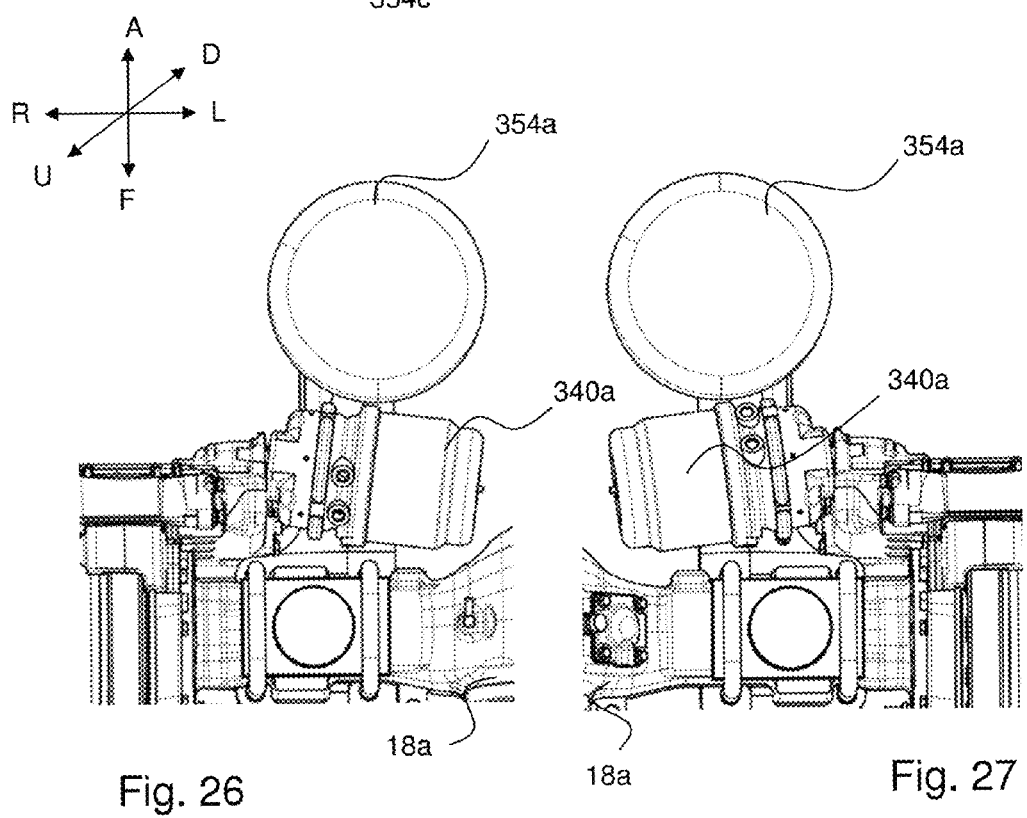
FIG. 26 is a view of an air chamber and air bag of the aft axle assembly of FIG. 24.
FIG. 27 is a view of an air chamber and air bag of the aft axle assembly of FIG. 24.

The depressions 26b, 28b provide a space into which the air chambers can travel as the disc brakes wear, which avoids impact with the housing, and therefore permits the air chambers to be positioned at a negative angle. The axle assembly in a worn position is shown in FIGS. 21 to 23. Thus, the housing of the present invention advantageously permits the axle assembly to be more compact than axle assemblies of the prior art.

Figure 28:
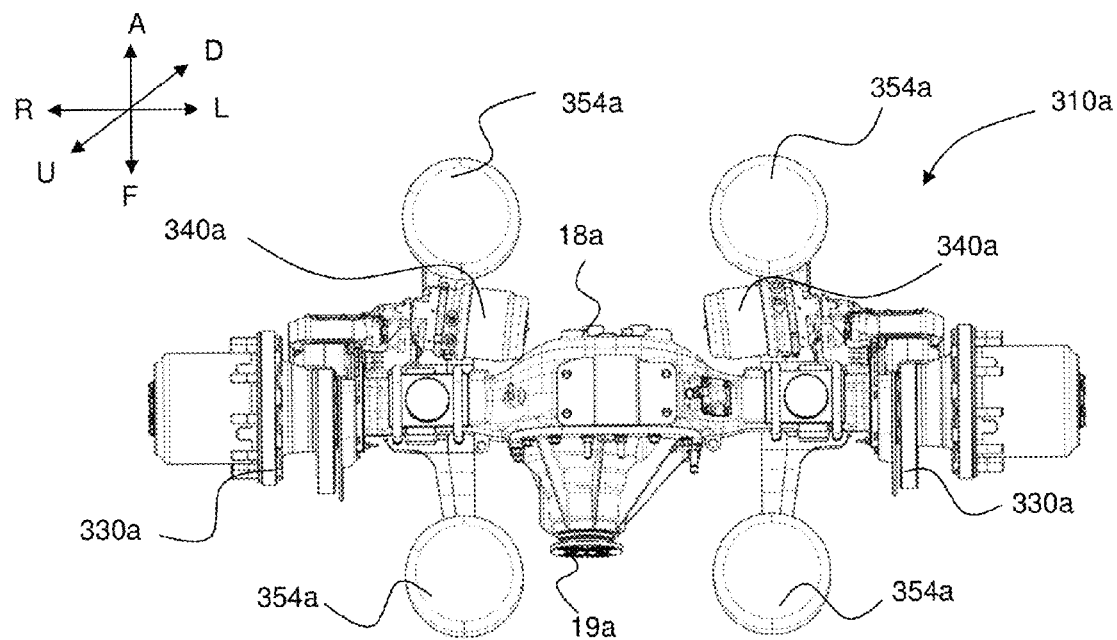
FIG. 28 is a plan view of the aft axle assembly of FIG. 24 in a worn condition.
Figures 29, 30:
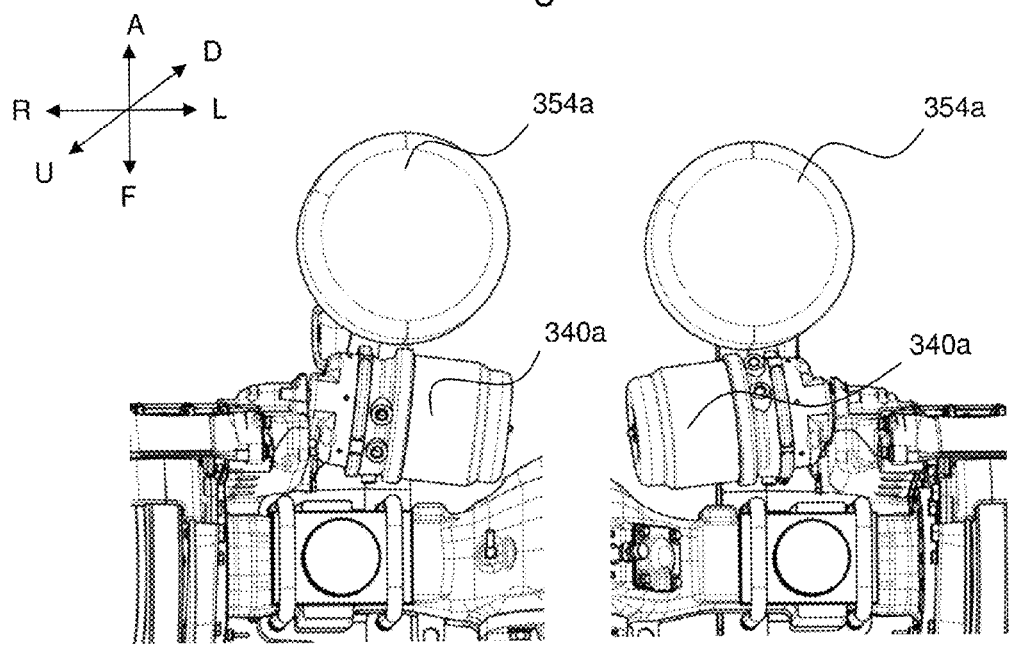
FIG. 29 is a view of an air chamber and air bag of the aft axle assembly of FIG. 28.
FIG. 30 is a view of an air chamber and air bag of the aft axle assembly of FIG. 28.

An aft axle assembly 310a having a housing 18a of the present invention is shown in FIGS. 24 to 30. The main features and advantages of this axle assembly are similar to those of the fore axle assembly 310b, so will not be described in detail again. FIGS. 28 to 30 show the axle assembly and position of the air chambers when the friction material and/or brake disc of the disc brake are worn.

Figure 34:
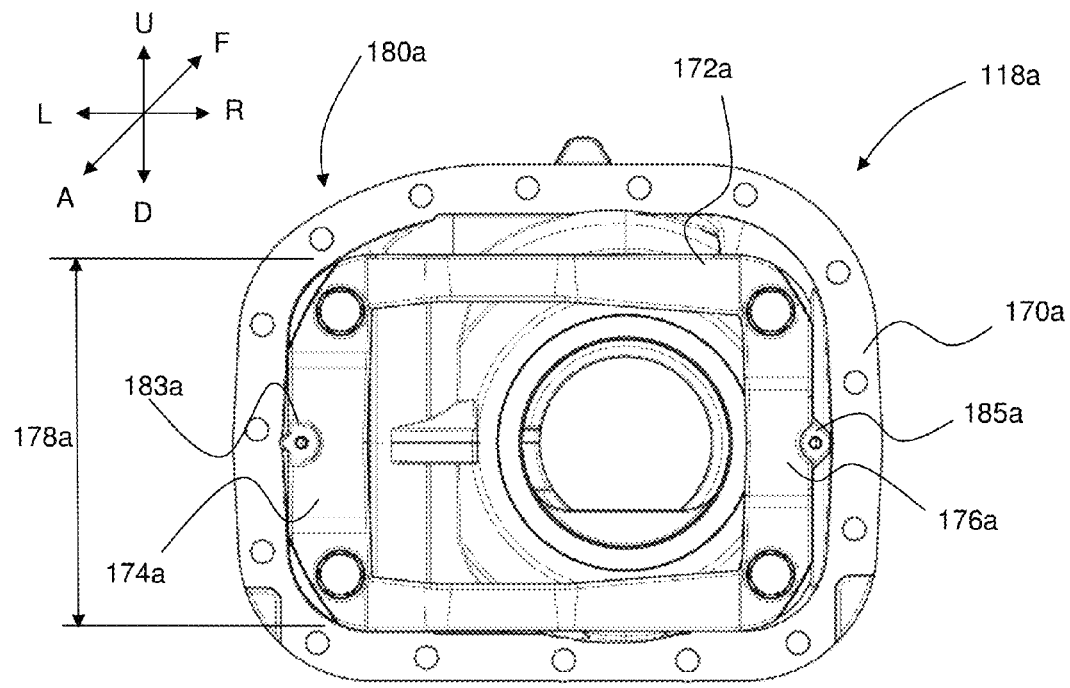
FIG. 34 shows a view through the centre of housing of an aft axle assembly of the prior art.
Figure 35:
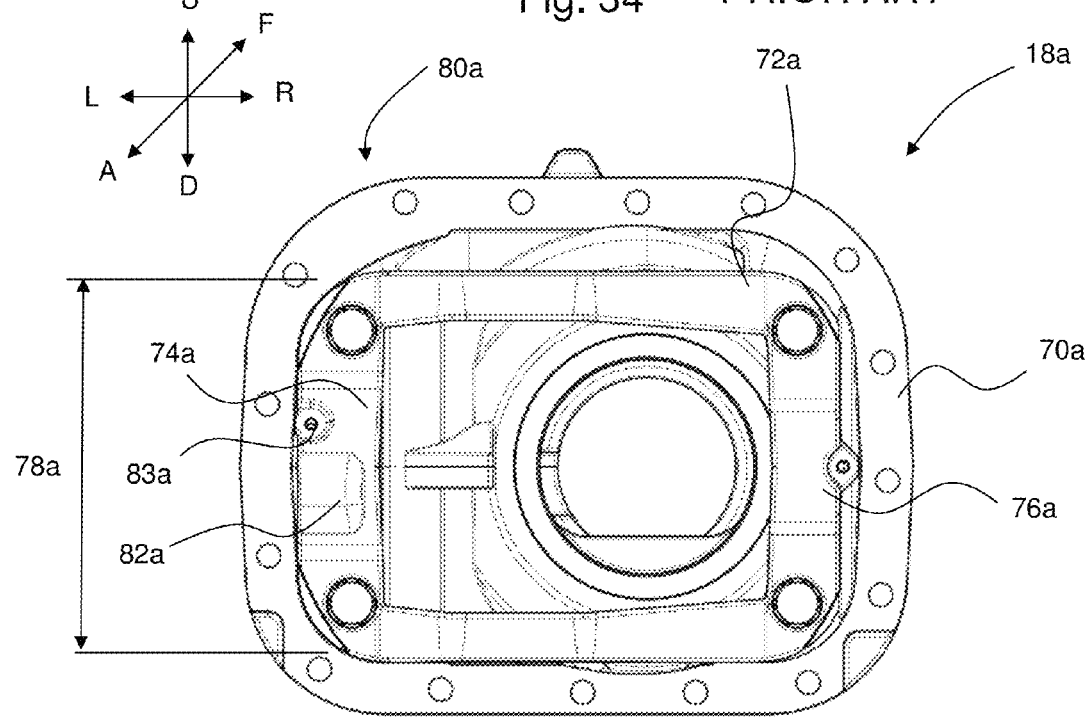
FIG. 35 shows a view through the centre of a housing of an aft axle assembly according to an embodiment of the invention.
Figure 36:
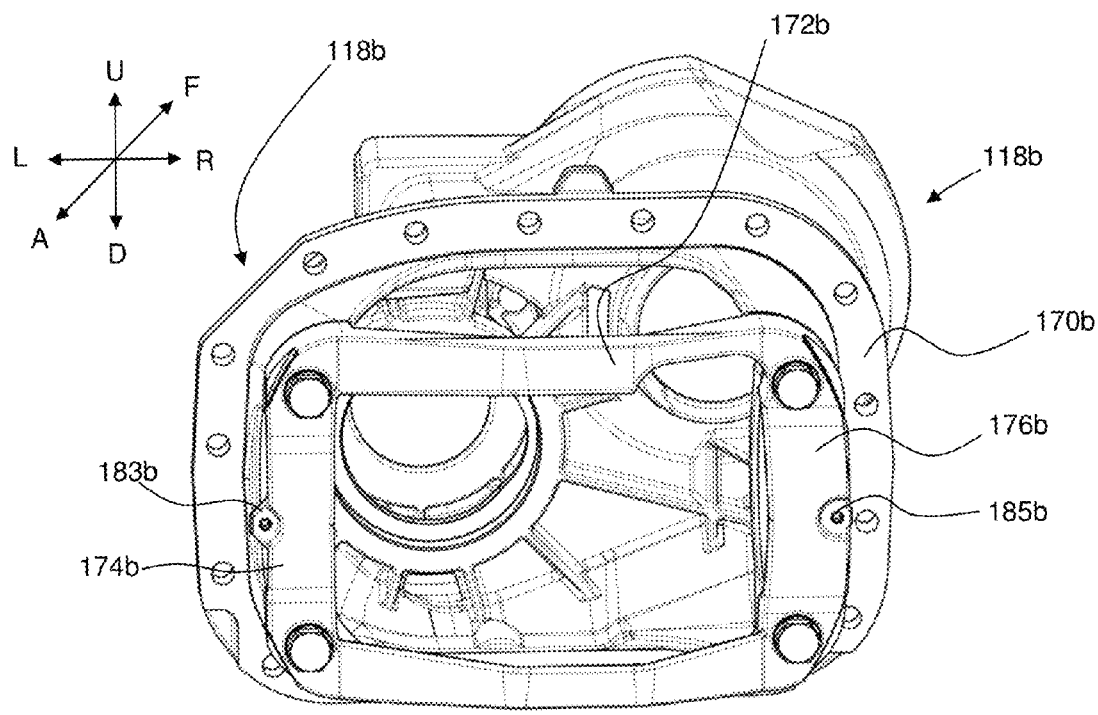
FIG. 36 shows a view through the centre of a housing of a fore axle assembly of the prior art.
Figure 37:
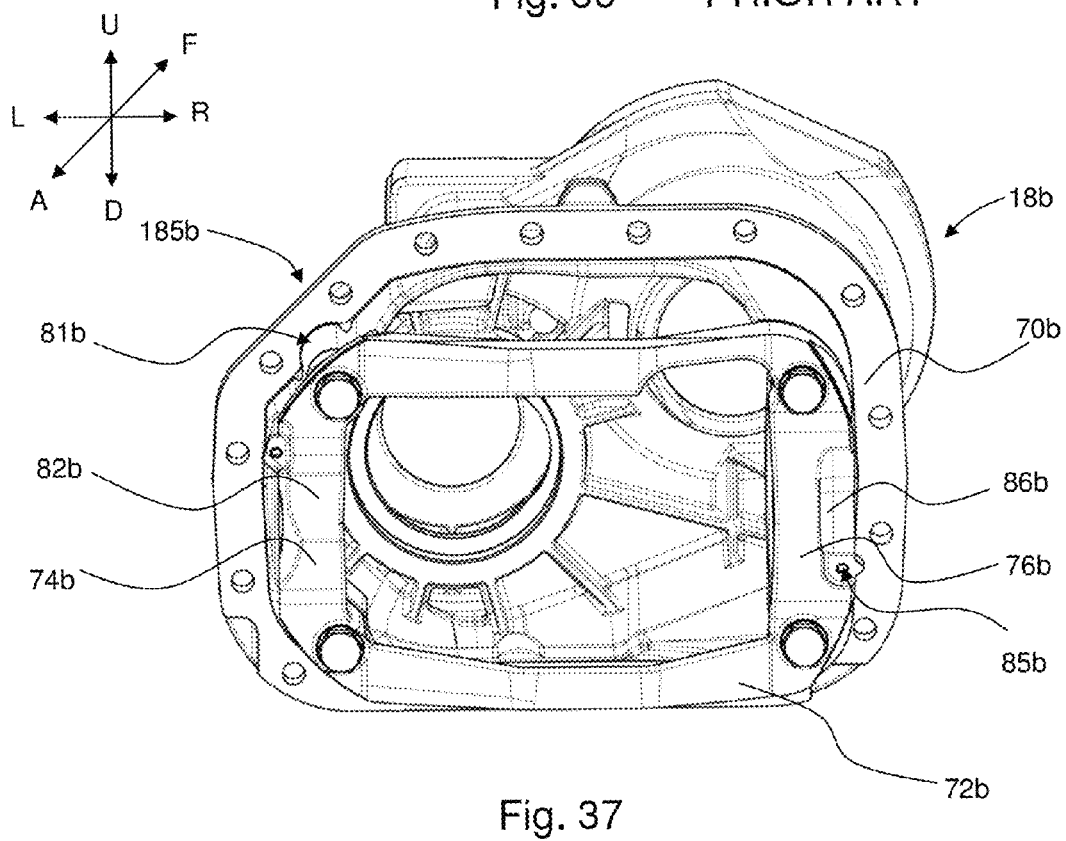
FIG. 37 shows a view through the centre of a housing of a fore axle assembly according to an embodiment of the invention.

To enable the housing 18a, 18b to be modified in the way described above it is necessary to alter the shape of components within the housing 18a, 18b. FIGS. 35 and 37 illustrate these alterations. FIGS. 34 and 36 show differentials of the prior art and are provided for comparison purposes.

Referring to FIG. 34 a housing 118a of an aft axle assembly of the prior art is shown and referring to FIG. 35 a housing 18a of an aft axle assembly according to an embodiment of the invention is shown. The common features will now be discussed. The housing 118a, 18a, is provided in two parts which are connected together via a flange 170a, 70a. A carrier 172a, 72a of the differential is within the housing 118a, 18a. A bearing cap 174a, 74a, 176a, 76a is positioned at the right and left side of the carrier 172a, 72a. The bearing caps 174a, 74a, 176a, 76a are used to retain bearings and attach the differential to the axles housing.

Referring to FIG. 35, the width 78a of the carrier in the upwards-downwards direction is shorter than the comparable width 178a of the carrier of the prior art (shown in FIG. 34). Further, the upper left corner 80a of the differential has a similar inner arc of a radius comparable to an inner arc of corner 180a of the prior art, but has an outer arc of reduced radius compared to a comparable outer arc of corner 180a of the prior art.

The bearing cap 74a positioned on the left side of the carrier comprises a concave depression 82a. To accommodate the depression 82a, a screw 83a that secures the bearing in the bearing cap is positioned offset from a central axis in the left-right direction. In this embodiment, a centre of the depression 82a is offset in the downward direction to a central axis in the left-right direction and the screw 83a is offset in an upward direction to a central axis in the left-right direction.

Referring to FIG. 36 a housing 118b of a fore axle assembly of the prior art is shown and referring to FIG. 37 a housing 18b of a fore axle assembly according to an embodiment of the invention is shown. Features in common with the housings 118a, 18a of the aft axle assemblies shown in FIGS. 34 and 35 will not be described again here.

Referring to FIG. 37, the profile on an inner and outer perimeter of the housing 18b of an upper left hand corner 80b is chamfered to a greater extent than a comparable corner 180b of the prior art. In this embodiment, an arched concave formation 81b is provided on an inner side of the corner 80b.

The bearing cap 74b on the left hand side of the carrier comprises a concave depression 82b across the thickness of the bearing cap and positioned substantially central to the bearing cap in an upwards-downwards direction. The bearing cap 76b on the right hand side of the carrier comprises a planar depression 86b. The depression 86b is positioned on the right-most side of the bearing cap and extends across just under half the length of the bearing cap in the right-left direction. The planar depression has a substantially flat profile and extends in a upward-downwards direction. Due to the presence of the depressions 82b, 86b in the bearing caps 74b, 76b, screws 85b (only one shown) connecting bearings to the bearing caps are positioned offset from a central axis in a right-left direction, whereas in the prior art the comparable screws 183b, 185b are coincident with a central axis in the right-left direction.

The bearing caps and housing undergo substantial loading during use. However, the present inventors have found using finite element modelling techniques that the removal of material from the bearing caps and changing the shape of the housing in the manner described does not unduly affect the load bearing performance of the bearing caps or housing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    two hubs, each for connection to a wheel;
    a mounting arrangement for a braking system for braking a connected wheel;
    a housing that receives differential gears, wherein the housing has a central portion in which the differential gears are housed and a depression formed on an outer surface of the central portion, wherein the depression accommodates:
    (a) a slack adjuster when the mounting arrangement has a drum brake mounted thereon, wherein the slack adjuster is accommodated within the depression and permits movement of the slack adjuster in a direction away from one of the two hubs that is located nearest the drum brake so as to allow detachment of the slack adjuster; or
    (b) an air chamber when the mounting arrangement has a disc brake mounted thereon, wherein the air chamber is partially accommodated within the depression; and
    an actuation shaft mount for an actuation shaft, wherein the depression is positioned adjacent to the actuation shaft mount.

2. The axle assembly according to claim 1, further comprising a bearing cap within the housing, wherein the bearing cap contains at least one bearing and attaches a differential to the housing, and wherein the bearing cap comprises a depression positioned to accommodate a portion of the depression formed in the housing.

3. An axle assembly comprising:
    two hubs, each for connection to a wheel;
    a mounting arrangement for a braking system for braking a connected wheel;
    a housing that receives differential gears, wherein the housing has a central portion in which the differential gears are housed and a depression formed on an outer surface of the central portion, wherein the depression accommodates:
    (a) a slack adjuster when the mounting arrangement has a drum brake mounted thereon, wherein the slack adjuster is accommodated within the depression and permits movement of the slack adjuster in a direction away from one of the two hubs that is located nearest the drum brake so as to allow detachment of the slack adjuster; or
    (b) an air chamber when the mounting arrangement has a disc brake mounted thereon, wherein the air chamber is partially accommodated within the depression;
    wherein the housing further comprises an air cylinder mount for mounting an air cylinder of a drum brake system, wherein the depression is positioned adjacent to the air cylinder mount.

4. The axle assembly according to claim 3, further comprising a second depression, wherein the depression and the second depression are positioned on opposite sides of the air cylinder mount.

5. The axle assembly according to claim 4 wherein the housing has an aft face opposing a fore face, and an upward face opposing a downward face, and the depression and second depression are positioned on the aft face of the housing.

6. The axle assembly according to claim 5 wherein the air cylinder mount is positioned on the aft face.

7. The axle assembly according to claim 5, wherein the housing further comprises a coupling on the fore face for a connector shaft to transfer drive from a prime mover to the axle assembly via a further axle assembly.

8. The axle assembly according to claim 5 wherein the air cylinder mount is positioned on the upward face.

9. The axle assembly according to claim 8, wherein the housing further comprises a coupling for an input drive shaft from a prime mover on the fore face and a coupling for a connector shaft to provide drive for a further axle assembly on the aft face.

10. An axle assembly comprising:
    two hubs, each for connection to a wheel;
    a mounting arrangement for a braking system for braking a connected wheel;
    a housing that receives differential gears for permitting the wheels to turn at different speeds when a vehicle is negotiating a corner, wherein the housing has a central portion in which the differential gears are housed and a depression formed on an outer surface of the central portion, wherein the depression accommodates:
    (a) a slack adjuster when the mounting arrangement has a drum brake mounted thereon, wherein the slack adjuster is accommodated within the depression and permits movement of the slack adjuster in a direction away from one of the two hubs that is located nearest the drum brake so as to allow detachment of the slack adjuster; or
    (b) an air chamber when the mounting arrangement has a disc brake mounted thereon, wherein the air chamber is partially accommodated within the depression;
    two drum brakes each for braking one of the wheels, each drum brake having a brake shoe moveable between an applied position and a released position with an associated brake drum, an actuation shaft rotatable about a shaft axis, and an actuation device for transferring rotational movement of the actuation shaft into movement of the brake shoe from the applied position to the released position; and
    a slack adjuster connected to the actuation shaft for moving the actuation device so as to account for wear thereof.

11. An axle assembly comprising:
    first and second axles for connection to differential gears and first and second wheels, respectively;
    first and second drum brakes for braking the first and second wheels, respectively, wherein the first and second drum brakes each have a brake shoe moveable between an applied position and a released position with an associated brake drum, an actuation shaft rotatable about a shaft axis, and an actuation device for transferring rotational movement of the actuation shaft into movement of the brake shoe from the released position to the applied position;
    first and second slack adjusters, wherein the first slack adjuster is connected to the actuation shaft of the first drum brake and the second slack adjuster is connected to the actuation shaft of the second drum brake, wherein the first slack adjuster moves the actuation device of the first drum brake to account for wear of the brake shoe of the first drum brake and the second slack adjuster moves the actuation device of the second drum brake to account for wear of the brake shoe of the second drum brake; and a housing having a central portion that contains the differential gears for permitting the first and second wheels to turn at different speeds when a vehicle is negotiating a corner;

wherein first and second depressions that extend toward the differential gears are provided in an outer surface of the central portion, wherein the first depression receives the first slack adjuster and accommodates movement of the first slack adjuster in a direction away from the actuation shaft of the first drum brake so as to allow detachment of the first slack adjuster from the actuation shaft of the first drum brake, and the second depression receives the second slack adjuster and accommodates movement of the second slack adjuster in a direction away from actuation shaft of the second drum brake so as to allow detachment of the second slack adjuster from the actuation shaft of the second drum brake.

12. An axle assembly comprising:

first and second axles for connection to first and second wheels, respectively;

first and second disc brakes each for braking the first and second wheels, respectively;

first and second pneumatic actuation systems for actuating the first and second disc brakes, respectively, wherein the first and second pneumatic actuation systems have first and second air chambers, respectively; and a housing having a central portion that contains differential gears for permitting the first and second wheels to turn at different speeds when a vehicle is negotiating a corner;

wherein the housing has first and second depressions that extend toward the differential gears and are provided in an outer surface of the central portion, wherein the first depression receives the first air chamber such that the first air chamber is disposed at a negative angle with respect to a longitudinal axis of the axle assembly such that a longitudinal axis of the first air chamber is disposed at an acute angle with respect to the longitudinal axis of the axle assembly, and the second depression receives the second air chamber, wherein the second air chamber is disposed at a negative angle with respect to the longitudinal axis of the axle assembly such that a longitudinal axis of the second air chamber is disposed at an acute angle with respect to the longitudinal axis of the axle assembly.

\* \* \* \* \*